United States Patent
Perinchery et al.

(10) Patent No.: US 12,034,555 B1
(45) Date of Patent: Jul. 9, 2024

(54) INFLUENCER WATCH PARTY

(71) Applicant: DISH Network Technologies India Private Limited, Bengaluru (IN)

(72) Inventors: Melvin P. Perinchery, Bangalore (IN); Preetham Kumar, Belthangady (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/314,987

(22) Filed: May 10, 2023

(51) Int. Cl.
G06F 15/16 (2006.01)
H04L 9/32 (2006.01)
H04L 12/18 (2006.01)

(52) U.S. Cl.
CPC ........ H04L 12/1822 (2013.01); H04L 9/3247 (2013.01)

(58) Field of Classification Search
CPC . H04L 65/4015; H04L 65/401; H04L 65/403; H04L 9/3247
See application file for complete search history.

(56) References Cited

U.S. PATENT DOCUMENTS

| | | | |
|---|---|---|---|
| 10,762,474 B2 | 9/2020 | Frank | |
| 11,762,917 B2 | 9/2023 | Frank et al. | |
| 2019/0303874 A1* | 10/2019 | Yang | G06Q 50/01 |
| 2022/0029825 A1* | 1/2022 | Uhr | H04L 9/3239 |
| 2022/0139383 A1* | 5/2022 | Rose | H04L 12/1827 |
| | | | 704/232 |
| 2022/0224659 A1* | 7/2022 | El Ghazzal | G06N 20/00 |
| 2023/0147705 A1* | 5/2023 | Huertas | H04L 67/1095 |
| | | | 709/248 |
| 2023/0247067 A1* | 8/2023 | Adams | H04L 65/1093 |
| | | | 709/204 |

* cited by examiner

*Primary Examiner* — Joseph R Maniwang
(74) *Attorney, Agent, or Firm* — Kilpatrick Townsend & Stockton LLP

(57) ABSTRACT

Systems and methods for facilitating a watch party are provided. In one example, a method includes: initiating a watch party session for a host user using, presenting content selected by the host user on a first user device during the watch party session, initiating a chat session concurrent with the watch party session, receiving a participation request by a guest user sent from a second user device for participating in the chat session; in response to the participation request, authenticating the guest user; presenting the content selected by the host user on the second user device; synchronizing the presentation of the content on the first user device with the presentation of the second user device; and facilitating communication between the host user and the guest user during the chat session.

20 Claims, 15 Drawing Sheets

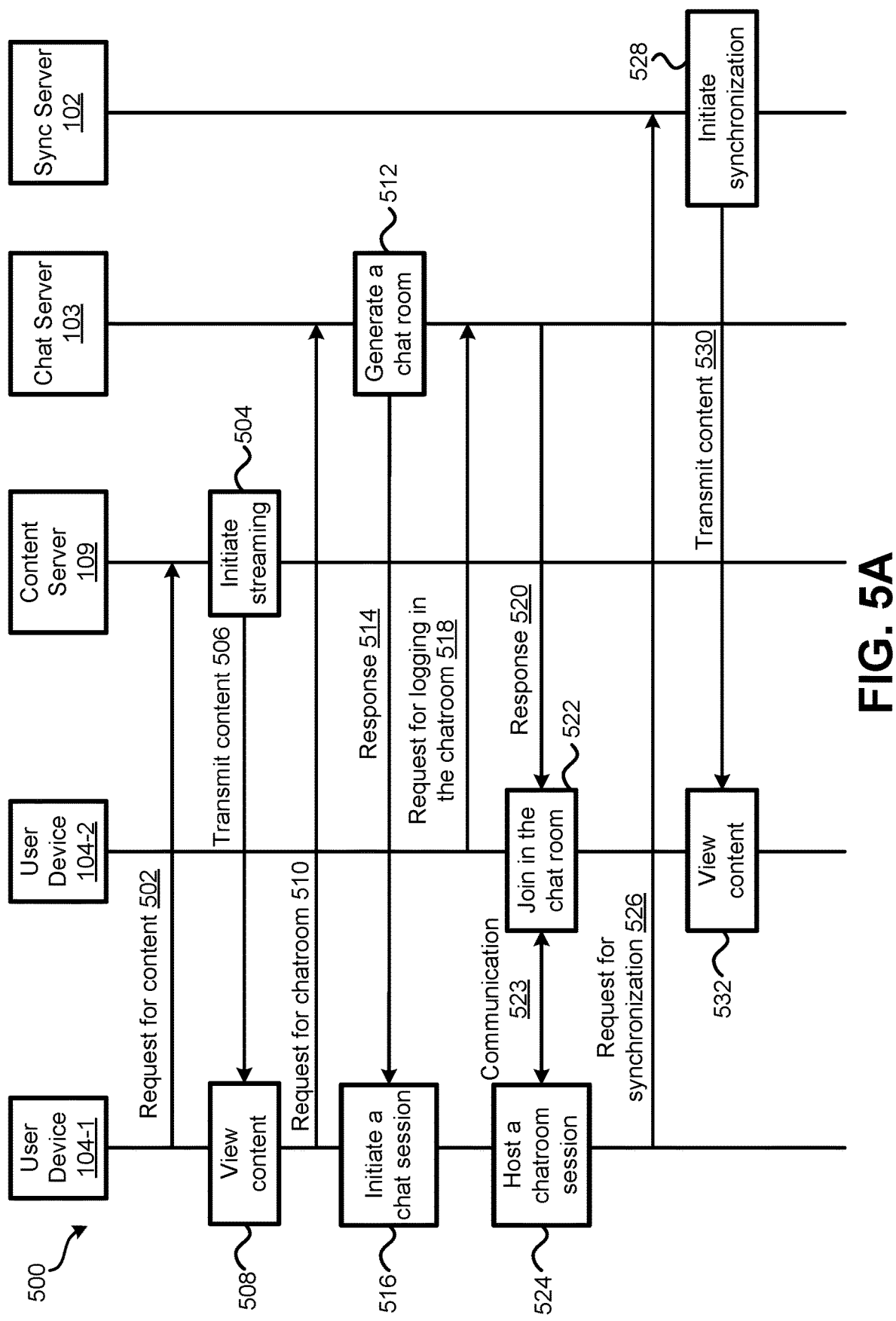

INFLUENCER WATCH PARTY

BACKGROUND OF THE INVENTION

Various devices, systems and processes today enable a person to be presented with content, such as a football game, television show, video game, soundtrack, or the like using a presentation device. Such content may be presented to a user in a humanly perceptible format, such as visually, audibly, as vibrations, combinations of the foregoing, or otherwise. Often a first user desires to be presented with such content at substantially the same time as another, second user. The second user may be physically located remotely to the first user, such as in another building, city, state, country or otherwise. The first user and the second user may desire to receive such content and, together participate in the reception of such content, include the sharing of their reactions to such content with others at substantially the same time as the content is presented to the users. It is desired to continue to improve user experience in a watch party and enhance user interaction experience.

BRIEF SUMMARY OF THE INVENTION

In accordance with some embodiments of the present disclosure, a method is provided. In one example, a method includes: initiating, in response to a first request by a host user sent from a first user device, a watch party session managed by the host user using the first user device, presenting content selected by the host user on the first user device during the watch party session, initiating in response to a second request sent from the first user device a chat session managed by the host user using the first user device, the chat session being concurrent with the watch party session in a user interaction event, receiving a participation request by a guest user sent from a second user device for participating in the chat session, in response to the participation request, authenticating the guest user, presenting the content selected by the host user on the second user device to allow the guest user to view the content on the second user device, synchronizing the presentation of the content on the first user device with the presentation of the second user device, and facilitating bi-directional communication between the host user using the first user device and the guest user using the second user device during the chat session.

In another example, a method includes: receiving, on a chat service provider, a chat service request from a user device, transmitting a signature verification value generated from the chat service provider to a DID authentication server, transmitting the signature verification value via a DID authentication server, to the user device, causing a DID application of the user device to generate a user signature by signing the signature verification value with a user private key, transmitting the user signature and a user DID to the DID authentication server, the user DID has been registered on a blockchain network, acquiring via the DID authentication server a user public key from the blockchain network, verify the user signature on the DID authentication server; in response to the verified user signature, transmitting via the DID authentication server the verified user signature and the user DID to the chat service provider, causing the chat service provider to provide service corresponding to the chat service request.

In another example, a method includes: authenticating a host user associated with a first user device, using DID authentication, in response to the authentication of the host user generating a chat room for the host user, receiving a request from a guest user associated with a second user device for participating in the chat room, authenticate the guest user using DID authentication, providing chat service to the second user device to allow the guest user to participate in a chat session initiated by the host user, in response to a request by the host user, initiating a watch party session concurrent with the chat session.

In accordance with some embodiments of the present disclosure, a system is provided. In one example, a system includes a first user device, a second user device, a DID authentication server, a blockchain network, one or more processors and a computer-readable storage media storing computer-executable instructions that, when executed by the one or more processors, causes the computer device to: initiate in response to a first request by a host user sent from the first user device a watch party session managed by the host user using the first user device, present content selected by the host user on the first user device during the watch party session, initiate in response to a second request sent from the first user device a chat session managed by the host user using the first user device, the chat session being concurrent with the watch party session in a user interaction event, receive a participation request by a guest user sent from the second user device for participating in the chat session, authenticate the guest user in response to the participation request, present the content selected by the host user on the second user device to allow the guest user to view the content on the second user device, synchronize the presentation of the content on the first user device with the presentation of the second user device, and facilitate bi-directional communication between the host user using the first user device and the guest user using the second user device during the chat session.

In accordance with some embodiments, the present disclosure also provides a non-transitory machine-readable storage medium encoded with instructions, the instructions executable to cause one or more electronic processors of a system to perform operations of a method described herein.

BRIEF DESCRIPTION OF THE DRAWINGS

The features, aspects, advantages, functions, modules, and components of the devices, systems and processes provided by the various implementations of embodiments of the present disclosure are further disclosed herein regarding at least one of the following descriptions and accompanying drawing figures. In the appended figures, similar components or elements of the same type may have the same reference number and may include an additional numerical designator, such as 104-1, 104-2, . . . , 104-N, and the like, wherein the numerical designator indicates that the components bearing the same reference number, e.g., 104, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional numerical or alphabetic designators or second reference labels, if any.

FIGS. 5A and 5B illustrate example system messaging diagrams of the interactions between components of a system described herein, in accordance with various embodiments.

DETAILED DESCRIPTION OF THE INVENTION

Figure 1:
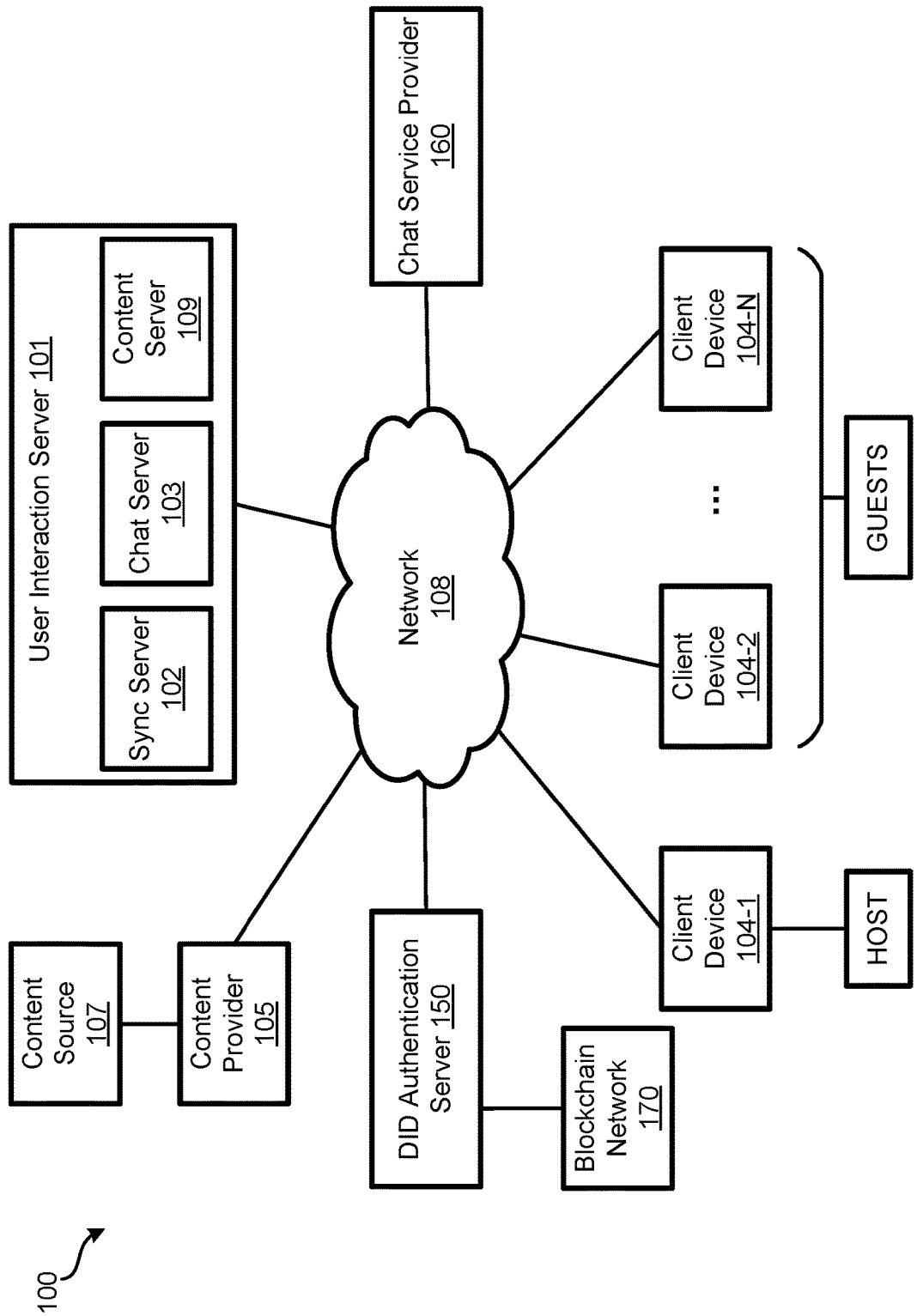
FIG. 1 is a schematic illustration of an example of a system for facilitating a multimedia user interaction event, in accordance with various embodiments of the present disclosure.

The various embodiments of the present disclosure describe devices, systems, and methods for facilitating watch parties.

In various embodiments, a method is provided to improve user interaction in a watch party. One insight provided by the present disclosure is that the method can be used to generate a user interaction event that integrates a watch party session and a chat session concurrent with the watch party session. A host member (e.g., a celebrity, a public figure, an influencer, etc.) may manage the watch party session to allow guest members (e.g., fans or social guests) of the watch party session to share media contents selected by the host member. In the concurrent chat session, the method allows the host member to interact with the guest users in the chat session, make comments and reactions regarding the media content being presented, and share other information with the guest members. In this way, both the host and the guest members may be more engaged in the watch party, which may enhance the celebration of the watch party and the user experience. In some examples, the guest members who participate in the chat session may view the media content presented by the host member and interact directly with the host member, without subscription to the content provider, which could conveniently and economically benefit the guest members.

Another insight provided by the present disclosure is that the method may be used to authenticate users who want to obtain chat service or participate in the host member's watch party using decentralized identifier (DID) authentication. With DID authentication, cumbersome user ID and password management is no longer needed. DIDs allow for zero-knowledge proof of identity whereby users can prove control of DIDs without revealing any sensitive personal information and without requiring permission from a centralized third-party entity. This may be helpful for watch party members, particularly celebrity, public figure, and social influencers, to keep their user information, account information, and other personal information unexposed when they engage in the user interaction in watch party with a large number of unknown social guests. In addition, the DID authentication can significantly enhance protection of user account and reduce the risk of invasion to privacy.

Yet another insight provided by the present disclosure is that the method allows multiple layers of synchronization. In addition to synchronization of the presentations of the media content on multiple user devices, the presentation of media content and the presentation of chat messages from user devices may also be synchronized. The chat room may be managed according to pre-established rules to only present chat messages that are timely responsive and/or relevant to the media content presented in the watch party session. The method may allow synchronization of presentations of the same media content received from different content providers with respect to different users. Each user may be a subscriber to a particular content provider. Each user can be separately authenticated to access the particular content provider associated with the user. The users can view the synchronized media content provided by their corresponding content providers in the same user interaction event.

A further insight provided by the present disclosure is that the method may allow multiple host users to co-host the user interaction event. The priority of the host users may be automatically determined based on pre-established rules. The watch party session and the chat session may be managed based on the priority of the host users.

As used herein, a "watch party" is a "substantially simultaneous" (as defined below) and "separate" presentation of "content," one or more user "reactions" thereto, to each of two or more users.

As used herein, "substantially simultaneous" means without incurring a humanly perceptible delay between a presentation of one or more, if not both, of the content and a reaction to such content by a given user, to two or more other users. In essence, the second user is presented with the first user's reaction as if they both were physically present in a same room and viewing the media content together.

As used herein, "content" refers to any humanly perceptible information, such as video, television programs, audio programs, speeches, concerts, gaming, or otherwise. The content may originate from any source, including live, augmented reality, virtual reality, computer generated, or otherwise. The content may be presented to a given user using any desired user device (as described below). The content may be presented to one or more users "real-time" (which is defined herein to mean as the underlying action provided in such content first occurs in time), on a recorded, time delayed, time shifted, or any other basis.

As used herein, "separate" when referring to two or more users participating in a watch party, means a first user may be physically or virtually separated from one or more second users such that each user is uniquely presented the content, in whole or in part, in a format perceptible by such user. Such separation may occur geographically, wherein a first user is in a different room, building, city, state, or country than one or more second users. For at least one embodiment, a separation may occur virtually, such as when a first user perceives the content and/or reaction(s) as presented, in whole or in part, in a first format (such as an audible portion of the football game in a first language), while a second user perceives the content and/or reactions in a second format (such as the audible portion of the football game being provided in a second language). For at least one embodiment, such separation may occur both geographically and virtually.

As used herein, "chat room," or "chatroom," "group chat" refers to a form of synchronous conferencing to facilitate real-time online chat and online interaction among multiple users of the chat room in immersive graphical social environments. A chat room provides a communication platform for users to exchange/communicate messages, e.g., textual messages, audio messages, video messages, voices, symbols, emojis, reactions, digital documents, digital files, and so on, with each other.

As used herein, a "user interaction event" refers to a multimedia service that integrates a watch party session and a chat room session concurrent with the watch party session. In a user interaction event, users can share contents presented on the watch party session while concurrently communicating messages in the chat room in a real-time manner.

As used herein, an "engine" refers to at least one of a dedicated hardware, such as an application specific integrated circuit (an "ASIC"), a combination of hardware with specially purposed computer instructions, a combination of general-purpose hardware, such as a central processing unit ("CPU") and non-volatile computer instructions (as defined below) configured to perform certain data processing operations, and the like. It is to be appreciated that such engines may be provided separately, collectively, or otherwise by one or more correspondingly configured physical devices, systems, and/or collection of devices and systems, including but not limited to those provided using a distributed system or otherwise.

As used herein, a reference to "Cloud" includes without limitation references to cloud computing, cloud storage, cloud communications, and/or other technology resources which do not require a viewer to actively manage the providing or use of such resources. A use of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide for processing, storage, and other functions.

FIG. 1 is a schematic illustration of an example of a system 100 for facilitating a user interaction event, in accordance with various embodiments. In the illustrated example, the system 100 includes a user interaction server 101, a content provider 105, a content source 107, a decentralized identifier (DID) authentication server 150, a chat service provider 160, multiple user devices 104 (e.g., a first user device 104-1, a second user device 104-2, . . . , a $N^{th}$ user device 104-N), a blockchain network 170, and a communication network 108, such as one that utilizes in whole or in part the Could.

The user interaction server 101 is in communication with the multiple user devices 104 through the communication network 108. The user interaction server 101 is configured to initial, control, maintain, and terminate a user interaction event for one or more of the user devices 104. In some embodiments, the user interaction server 101 includes a synchronization server 102 (also referred to as a "sync server"), a chat server 103, and a content streaming server (also referred to as a content server) 109. The synchronization server 102 is configured to initiate and control a watch party session in a user interaction event where authenticated users can share contents. The chat server 103 is configured to generate a virtual chat room and initiate and control a chat session in a user interaction event for those authenticated users to chat and communicate messages while simultaneously sharing contents in the watch party session. The content streaming server 109 is configured to stream media contents in user interaction event. In some embodiments, the content server 109 and the chat server 103 are owned or operated by the same operator. In other embodiments, the content server 109 and the chat server 103 are operated separately by different operators. For example, the chat server 103 may be operated by a third-party providing chat service (e.g., the chat service provider 160). More examples of the user interaction server 101 and various components thereof are described below with reference to FIG. 2A.

The user devices 104 is in communication with the content provider 105 through the communication network 108. The content provider 105 is configured to receive content from the content source 106. Non-limiting examples of content providers 105 include SLING TV, NETFLIX, AMAZON PRIME, and others. Content providers 105 commonly receive content from content sources 107. Non-limiting examples of content sources 107 include television networks, such as ABC, NBC and the like, pay-per-view transmission, online channels, and otherwise.

Non-limiting examples of user devices 104 include smartphones, laptop computers, tablet computing devices, desktop computers, smart televisions, smart glasses, virtual reality glasses, augmented reality glasses, earbuds/headphones and other audible output devices, and other devices. User devices 104 may be communicatively coupled to a cable system, satellite system, streaming audio and video system, online gaming system, and/or other content distribution systems, on-line content distribution systems, and the like to facilitate communications with the user interaction server 101.

In some embodiments, one user device (e.g., the first user device 104-1) may be used by a host user, who can request a user interaction event and serve as the host of the user interaction event initiated on the user interaction server 101. One or more user devices (e.g., the second user device 104-2, . . . , the $N^{th}$ user device 104-N) may be used by one or more guest users, who can request for participating in the user interaction event. In some embodiments, the host may be a celebrity such as a movie star or a sport star, and the one or more guest users may be social guests known or not known to the celebrity.

For at least one embodiment, a content provider 105 may contain multiple content nodes and include use of a content distribution network ("CDN"). A CDN is generally a geographically distributed network of proxy servers and data centers configured to provide content to end users.

The DID authentication server 150 provides authentication services to authenticate the users of the user devices (i.e., the host and guests) and to allow the authenticated users to initiate and/or participate in user interaction event on the user interaction server 101. The DID authentication server 150 is configured to receive and process authentication information (e.g., a user DID, DID-related user information, a DID document, user signature, etc.). In some embodiments, the DID authentication server 150 is operated by a third-party providing DID authentication services for the users. Details of the DID authentication server and DID authentication process are described below with reference to FIG. 4.

The blockchain network 170 is in communication with the DID authentication server 150. The blockchain network 170 may be any decentralized, distributed network that includes various computing systems that are in communication with each other. The blockchain network 170 is used to store a representation of a DID that points to a DID document and generate the user public key. In some embodiments, the DID document may be stored on a distributed ledger included in the blockchain network. Alternatively, in other embodiments, the DID document may be stored in a data storage (not illustrated) that is associated with the blockchain network 170. Each of these components of the system 100 are further described below.

The communications network 108 communicatively couples each user device 104 with the user interaction server 101 and communicatively couples to the content source 106 and other components in the system 100. For at least one embodiment, user devices 104 may be directly or indirectly coupled to each other. The communications network 108 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise.

Figure 2A:
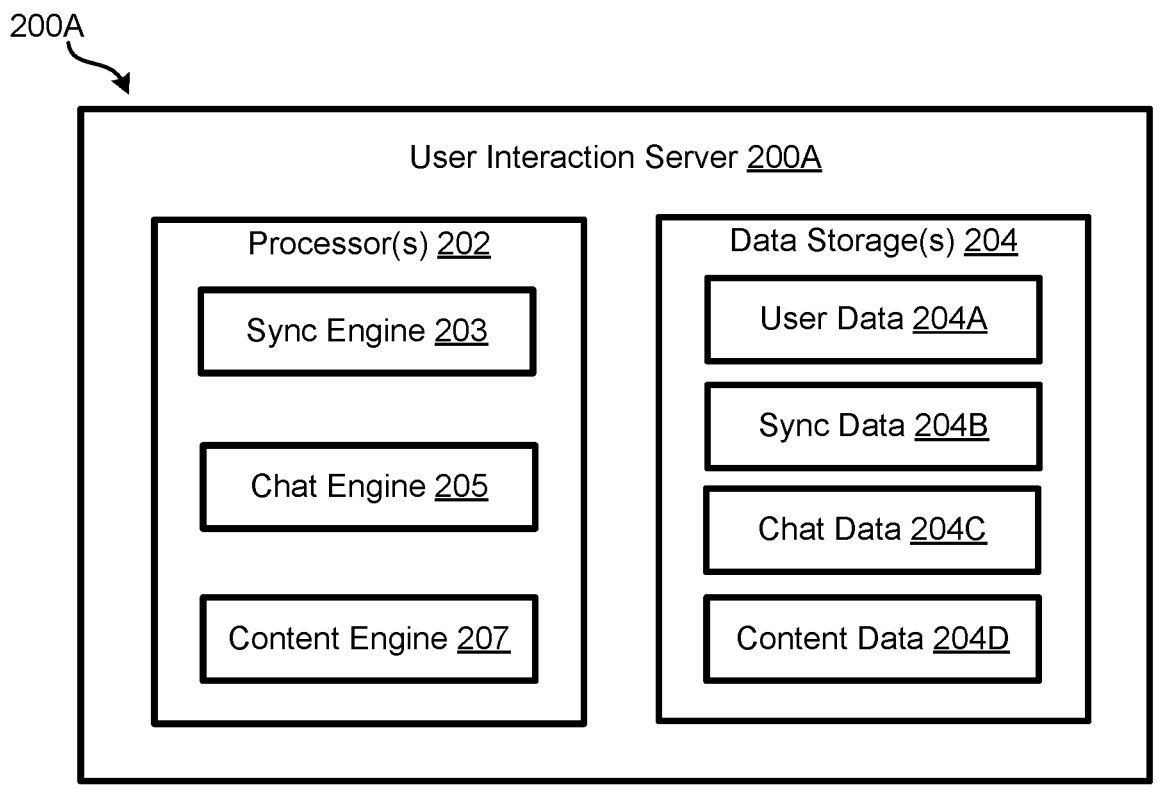
FIG. 2A is a schematic illustration of an example of a user interaction server, in accordance with various embodiments of the present disclosure.

FIG. 2A is a schematic illustration of an example of a user interaction server 200A, in accordance with various embodiments. The user interaction server 200A is an example representation of the user interaction server 101 of FIG. 1. In the illustrated example, the user interaction server 200A includes one or more electronic processors 202, and one or more data storage devices 204. The one or more electronic processors 202 include, among other components, a server synchronization (sync) engine 203, a server chat engine 205, and a content streaming engine 207. The user interaction server 200A may additionally include interface components, security components, communications components, and other components. The server sync engine 203 may be instantiated on the sync server 102 (FIG. 1); the server chat engine 205 may be instantiated on the chat server 103 (FIG. 1); the content streaming engine 207 may be instantiated on the content streaming server 109 (FIG. 1).

The one or more electronic processors 202 may be provided by any local processing device capable of executing one more non-transient computer executable instructions (herein, each a "computer instruction") which, in accordance with an embodiment of the present disclosure, facilitate one or more data processing operations including, but not limited to, the server sync engine 203, the server chat engine 205, and the content streaming engine 207. It is to be appreciated that for at least one embodiment, one or more of the server sync engines 203, the server chat engine 205, and the content streaming engine 207 may be combined and/or provided separately.

The one or more electronic processors 202 may be communicatively coupled, by a server data bus or similar structure, to other components of the server including, but not limited to, the one or more data storage devices 204, which may also be referred to as a "computer readable storage medium." The storage devices 204 may be provided locally with the sync server 102 or remotely, such as a data storage service provided on the Cloud, and/or otherwise. Storage of data, including but not limited to user data 204A, connection data 204B, server chat data 204C, and content data 204D. The user data 204A may further include user account information, authentication information, DID and DID-related user information, DID document, and so on. The data stored in the storage device 204 may be managed by a storage controller (not shown) or similar component. It is to be appreciated such storage controller manages the storing of data and may be instantiated in one or more of the storage device 204, the processors 202, on the Cloud, or otherwise. Any known or later arising storage technologies may be utilized in conjunction with an embodiment of the present disclosure.

In some embodiments, the server sync engine 203 may be configured to facilitate synchronization of content by designating a given user device 104, such as a first or "host" user device 104-1, while designating each of the remaining user devices participating in a given watch party as a guest user device—such as user devices 104-2 and 104-N. The server sync engine 203 may be configured to manage synchronization of content during a live and/or recorded content watch party and while such content is provided by the content provider 105 to respective user devices 104-1/2/N in a watch party session. In some embodiment, the server sync engine 203 facilitates synchronization of content amongst the various user devices based upon determined communications network delays (herein, "latency"), user device content and/or reaction processing delays (herein, "user device delays"), and other delays. In some embodiments, the server sync engine 203 may be configured to manage formation of watch parties, determine latency, user device delays, and other delays, and synchronize the providing of content for presentation on a given user device. For at least one embodiment, content synchronization may occur based upon one more identifiable portions of a content. For at least one embodiment, content portions may be identified by one or more of an elapsed time, a remaining time, a presentation time stamp, a decoder time stamp, an absolute time (such as a time based on a universal time), a packet number, or packet identifier, or otherwise.

The content streaming engine 207 may be configured to manage the providing of content to each user device 104 during a watch party. For at least one embodiment, the user interaction server 200A may be configured to operate as one or more streaming servers (e.g., the content streaming server 109 of FIG. 1), with each streaming server providing content to one or more given user devices 104. The content streaming engine 207 may be configured to request (when needed) and receive one or more content segments from a content source 106. The content streaming engine 207 may further be configured to buffer, temporarily store, and/or permanently storage of such content segments for later providing of the same to one or more user devices.

The content streaming engine 207, instantiated on the content server of the user interaction server 200A, may be configured to control one or more aspects of presentation of a given content. For example, and not by limitation, one or more trick-play modes may be supported by the content streaming engine 207, non-limiting examples of trick-play modes include: Pause, Play, Skip, Fast Forward, Reverse, Stop, and the like. The content streaming engine 207 may be configured such that a given content segment is communicated to each of the two or more user devices participating in a given watch party such that any latency, user device delays and/or other delays associated with such communication and processing of the content segment by each user device are accounted for and such that the presentation of the given content segment occurs substantially simultaneously across each user device then participating in the watch party.

The content streaming engine 207 may be configured to facilitate a substantially simultaneous presentation of a given content segment by adaptively modifying one or more of the resolution, bit rate, content size, communications bandwidth utilized, communications link type used between the content server of the user interaction server 200A and a given user device 104, or otherwise.

The server chat engine 205 may be configured to facilitate communications between user devices 104 in a chat session during a watch party. In some embodiments, the server chat engine 205 includes a chat room generation module (not shown) configured to generate a virtual chat room in response to a request by a host user (e.g., a celebrity) and initiate a chat session for the user-host to present content (e.g., a celebrity show) to the guest users in the generated chat room. For at least one embodiment, communications among users in the chat session may be performed using one or more chat links and/or media links that connect the user devices 104 and the chat engine 203 on a web interface. Such communications may take any desired form, such as audio, text message, emoticons, video, audio, GIFs, video, graphics, or otherwise. The chat engine 203 may facilitate user-to-user (or private) communications, user-to-multiple user (or semi-private) communications, user-to-all (or public) communications, or otherwise.

For at least one embodiment, user communications in the chat room may be stored in data storage device 204 as server chat data 204C. Such chat data may be time stamped and/or otherwise synchronized with respect to a given content segment such that a later playback of the chat data and/or the given content segment may include chat data corresponding to such given content segment, as such chat data was generated during the given watch party concurrent with the chat session. For example, a later viewing of the celebrity show and watch party by an N$^{th}$ user (guest) may include a presentation of the chat data arising between a first user (e.g., the host user) and a second user (e.g., one of the guest users) during the original watch party. Such later synchronization and presentation of chat data may enable the N$^{th}$ user to enjoy the original watch party as if participating real-time even though such watch party may in fact have occurred earlier.

The chat data communicated over the chat link may be adaptively bit-rate provided to the various users in a chat session such that each user receives the communication in the chatroom at substantially the same time as the watch party session in the same user interaction event. For example, a video camera focused upon a first user (e.g., the host user) may adaptively bit-rate stream images (and audio) of such first user to other second users (e.g., the guest users) such that the reactions of the first user or the messages sent from the first user, as presented to the second users are in substantially simultaneous synch with the presentation of the given content (e.g., the celebrity show) being presented in the watch party session. Accordingly, and for at least one embodiment, a chat link may be configured to utilize higher speed communications links than are used to facilitate the content streaming in the chatroom such that reactions to content and communications among the users in the chat session may be in substantially simultaneous synchronization with the content being played and shared during a watch party session. For at least one embodiment, chat links are provided using networks supporting high band 5G communications.

Figure 2B:
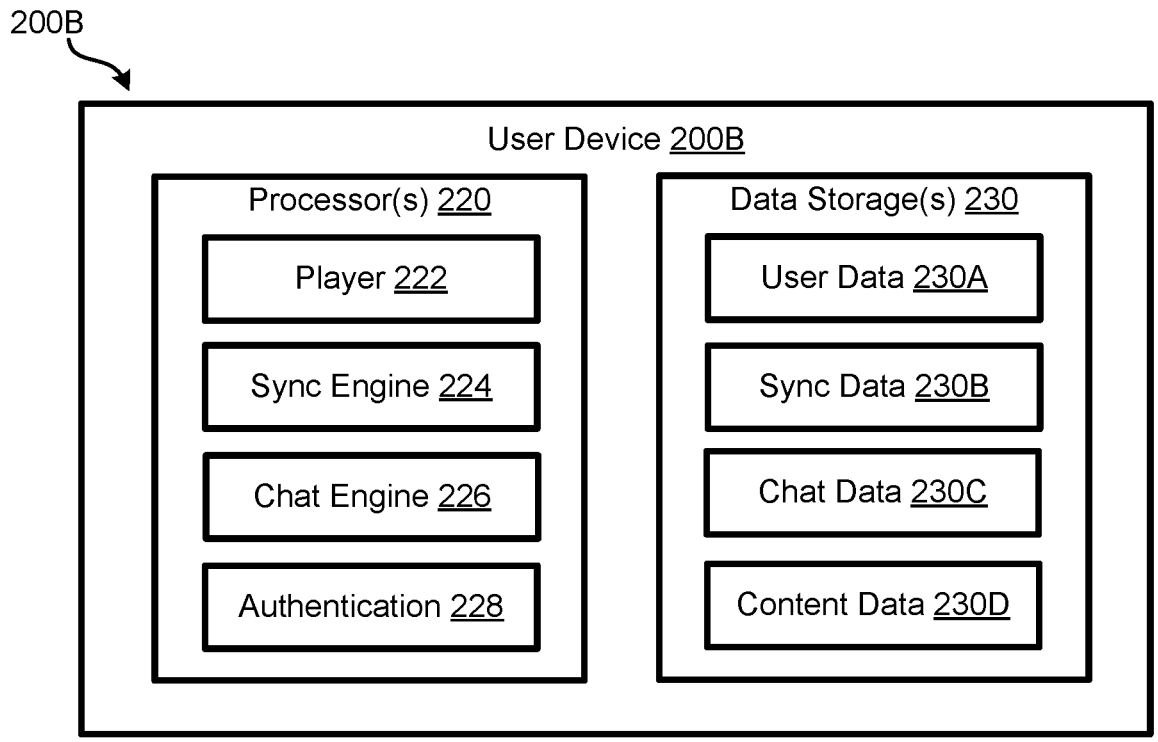
FIG. 2B is a schematic illustration of an example user device, in accordance with various embodiments of the present disclosure.

FIG. 2B is a schematic illustration of an example of a user device 200B, in accordance with various embodiments. The user device 200B is an example representation of the user device 104 of FIG. 1. The user device 200B may be similarly configured to the user interaction server 101 of FIG. 1 to include, among other components, one or more electronic processors 220, data storage devices 230, a user device interface 240, power components, security components, and communications components. The user device 200B may also include one or more location components (not shown) that may be useful in determining a then present location for the user device 200B.

The one or more processors 220 of the user device 200B may include a user player engine 222, a user device sync engine 224, a user device chat engine 226, and a user authentication engine 228. The user device sync engine 224 and the user device chat engine 226 may be configured to support the features and functions of the server sync engine 203 and the server chat engine 205 in facilitating the synchronization of content in a watch party session and communication in a chat session across user devices 200B participating in a user interaction event. The one or more of data storage devices 230 include, among other components, user data 230A, sync data 230B, chat data 230C, and contend data 230D.

The user player engine 222 may be configured to facilitate substantially simultaneous presentation of a given content by adaptively modifying one or more of the resolution, bit rate, content size, communications bandwidth utilized, communications link type used between a content provider 105 and a given user device 104, or otherwise. The user player engine 222 may be configured to retrieve and synchronize presentation of content on a given user device 200B in order to facilitate a watch party session. For such an embodiment, the user player engine 222 on each of the user devices 200B may be configured to communicate status information over the content links to the content provider.

The user player engine 222 may be used in conjunction with a corresponding user device sync engine 224 to determine one or more characteristics of content reception by the given user device 200B, such as bandwidth, latency, resolution, and the like. Such user device content characteristics may be suitably stored as content data 230D and in the data storage device 230. User device user data 230A may be accessed by the user player engine 222 in determining one or more characteristics of content information to be received from a given content source for a given user device.

The user device sync engine 224 may be configured to manage synchronization of content during a live and/or recorded content watch party. Status information regarding the communication of content from a content provider to a user device 200B may be provided by the server sync engine 203 using sync links to each user device sync engine 224.

the user device sync engine 224 may be configured to cooperate with the server sync engine 203 to facilitate synchronization of content during a watch party session by accepting a designation of a given user device 104 as a host user device 104-1 or as a guest user device 104-2/N. For at least one embodiment, each user device may be configurable to function as a host or a guest. For at least one embodiment, a user device sync engine 224 may be configured to limit a user device's 104 capabilities and functions to being one or the other of a host or a client during a given watch party, all watch parties, or any watch party.

The user device sync engine 224 may be configured such that a given content, as presented by the host user device (e.g., user device 104-1) and shared with the guest user (e.g., user device 104-2/N), occurs such that any latency, user device delays, and/or other issues arising with the communication, processing, and/or presenting of a given portion of the content are addressed (if addressable). For at least one embodiment, the server sync engine 203 may be configured to facilitate synchronization of content by each user device sync engine 224 such that presentation of future content occurs substantially simultaneously across all user devices 104-1/2/N participating in a given watch party session.

The user device sync engine 224 may be configured such that adjustments to presentations of content by user devices occurs such that the presentation of such content by the user device(s) 104-1/2/N is at one or more of a preferred quality setting, a minimum quality setting, a maximum quality setting, or otherwise.

The user device sync engine 224 may be configured to use user device sync data 230B including, but not limited to, content timing information including, but not limited to, fast-play, slow-play and other sync options, provided by one or more user devices 104-1/2/N. User device sync data 230B may include all, a subset of, additional, different, or the same data and/or computer instructions used to facilitate synchronization of content presentation during a watch party as provided in the server sync data 204B. Non-limiting examples of user device sync data 230B may also include communications sockets used by user devices to connect with a content provider, IP addresses for user devices, user device identifiers, such as MAC addresses, communications network settings used for one or more of the content links, sync links, available buffer and/or storage, and otherwise. For at least one embodiment, the user device sync engine 224 may be configured to use user device user data 230A to a facilitate synchronization of content during a watch party session. User device user data 230A may include all, a subset of, additional, different, or the same data and/or computer instructions used to facilitate synchronization of content presentation during a watch party as provided in the server user data 204A. Non-limiting examples of user device user data 230A include user demographic information, user account information, user authentication information, user DID and DID-related user information, user device information such as capabilities, technologies supported, and the like, user preferences, user viewing histories, and the like.

The user device chat engine 226 may be configured to facilitate communication by and between users (e.g., between a host user and one or more guest users), via their respective user devices 104, in a chat session concurrently with a watch party session, and using chat links and/or media links established between the user device chat engine 226 and the server chat engine 205. In some embodiments, the user device chat engine 226 may be configured to support communication in a chat session between users in any humanly perceptible format; non-limiting examples including speech, video, text, emoticons, gestures, or otherwise. In some embodiments, the chat session facilitated by the user device chat engine 226 is independent from the watch party session facilitated by the user device sync engine 224. For at least one embodiment, the chat links and communicative aspects of a chat session may be established or unestablished at any time before, during, or after a given watch party session.

In some embodiments, the user device chat engine 226 may be configured to leverage proprietary, custom, open source, or otherwise provided conferencing software applications including, but not limited to, JITSI MEET, WEBEX, ZOOM, and other chatbot-based web applications or the like.

The user device chat engine 226 may be configured to utilize user device chat data 230C. User device chat data 230C may include all, a subset of, additional, different, or the same data and/or computer instructions used to facilitate synchronization of content presentation during a watch party session and communication during a concurrent chat session as provided in the server chat data 204C. User device chat data 230C may include any data and/or computer instructions which facilitate chat during a chat session concurrent with a watch party session in a user interaction event. Non-limiting examples of user device chat data 230C include chatroom communication contents, communications sockets used by user devices, IP addresses for user devices, user device identifiers, such as MAC addresses, communications network settings used for one or more chat links, and otherwise. For at least one embodiment, the user device chat engine 226 may be configured to use user device user data 230A to a facilitate communication during a chatroom session.

The user device chat engine 226 may be configured to facilitate any desired singular or combination of voice, video, web, or other communication or information-exchange activities including, but not limited to, chat, private rooms, polling, voting, verbal reactions, visible reactions, emoticons, or the like. The user device chat engine 226 may facilitate user-to-user (or private) communications, user-to-multiple user (or semi-private) communications, user-to-all (or public) communications, or otherwise during a chatroom session.

The user device user interface 240 may be configured to include one or more of an audio input/output (I/O) module, a visual I/O module, a text I/O module, a gesture I/O module and/or other interface modules. Various non-limiting features and functions of such I/O modules are described herein. Audio I/O modules may be configured to support the providing of audible signals between a user and a user device. Such audio signals may include spoken text, sounds, or any other audible information. Non-limiting examples of audio technologies that may be utilized in an audio I/O module include GOOGLE VOICE, SFTRANSCRIPTION, BRIGHTSCRIPT, GOOGLE ASSISTANT, SIRI, and others. The visual I/O module is configured to support the providing of visible signals between user devices during a watch party. Such visible signals may be in any desired form, such as still images, motion images, augmented reality images, virtual reality images, and otherwise. Such visible information may include one or more of humanly perceptible visible signals. The text I/O module is configured to support the providing of textual information input by a user using a user device 200B. Such textual information signals may be in any desired language, format, character set, or otherwise. Such textual information may include one or more of humanly perceptible characters, such as letters of the alphabet or otherwise. The gesture I/O module is configured to support the providing of gesture information, such as sign language, by a user using a user device. Such gesture information signals may be in any desired form or format. Such gesture information may include one or more of humanly perceptible characters, such as those provided by sign language.

Figure 3:
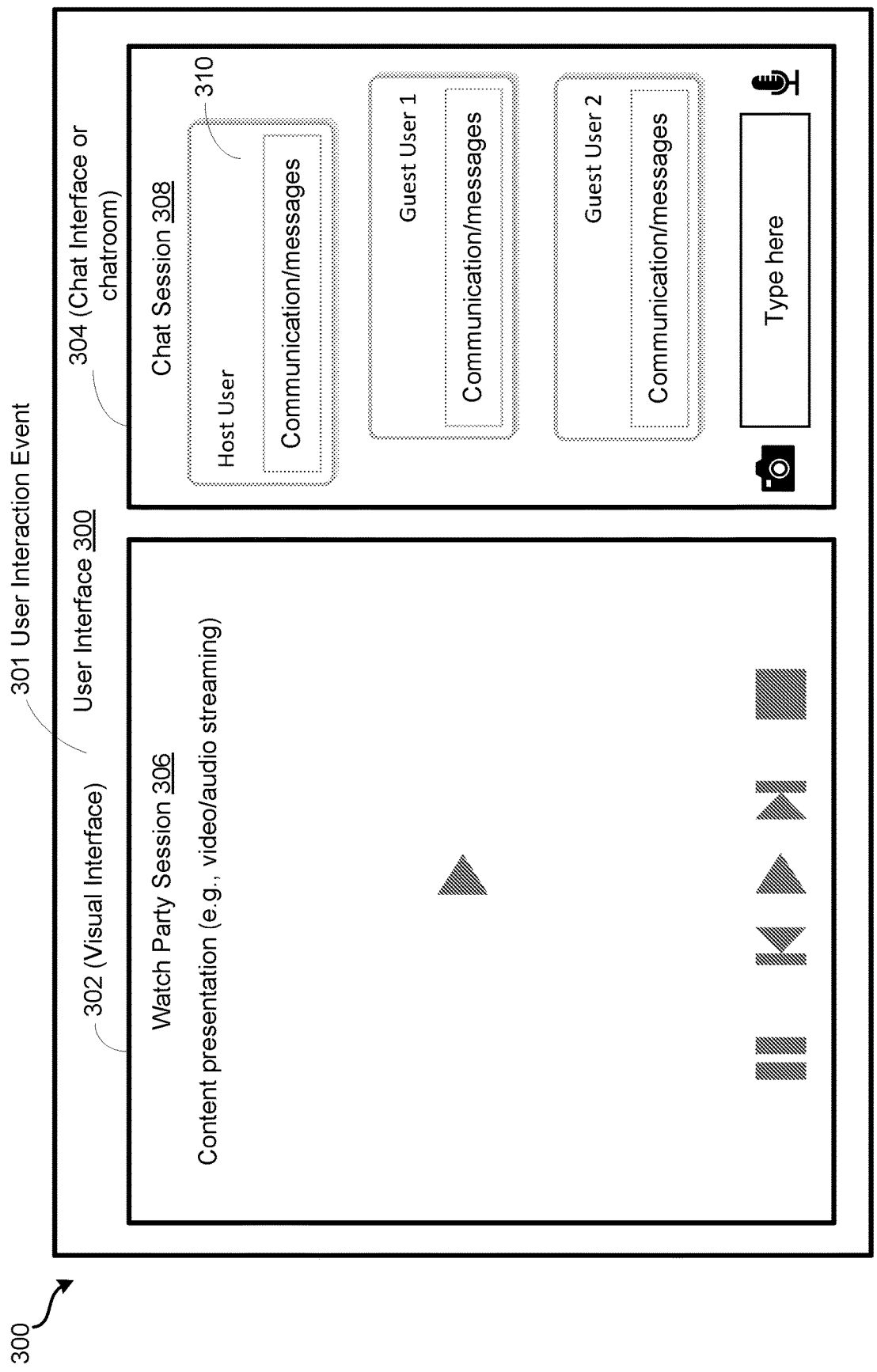
FIG. 3 is a schematic illustration of an example user interface of a user device for supporting a multimedia user interaction event, in accordance with various embodiments.

FIG. 3 is a schematic illustration of an example user interface 300 of a user device for supporting a user interaction event 301, in accordance with various embodiments. The user interface 300 may be a web interface that allows users to interact with content or software applications running on their user devices through a web browser. The user interface 300 includes, among other components, a visual interface 302 and a chat interface 304. In some embodiments, the visual interface 302 and the chat interface 304 may be arranged side-by-side on the web browser, such that the content on both the visual interface 302 and the chat interface are co-displayed in the web browser for the user to view. The user interaction event 301 may be initiated and managed by a host user using a first user device. The user interaction event 301 includes a watch party session 306 and a chat session 308 concurrent with the watch party session 306. During the watch party session 306, content (e.g., media content transmitted from the content provider) is presented on the visual interface of the host user device and each participating user device, and the presentations of content are synchronized across the user devices. During the chatroom session, users are allowed to communication with each other on the chat interface and exchange communications and messages through the chat boxes 310. The communications and messages may be related to the content presented on the visual interface 302 during watch party session. Non-limiting examples of the communication and message include comments (made by the host user and the guest users) on the content, reactions of the guest user, emotions, pictures, and so on.

Figure 4A:
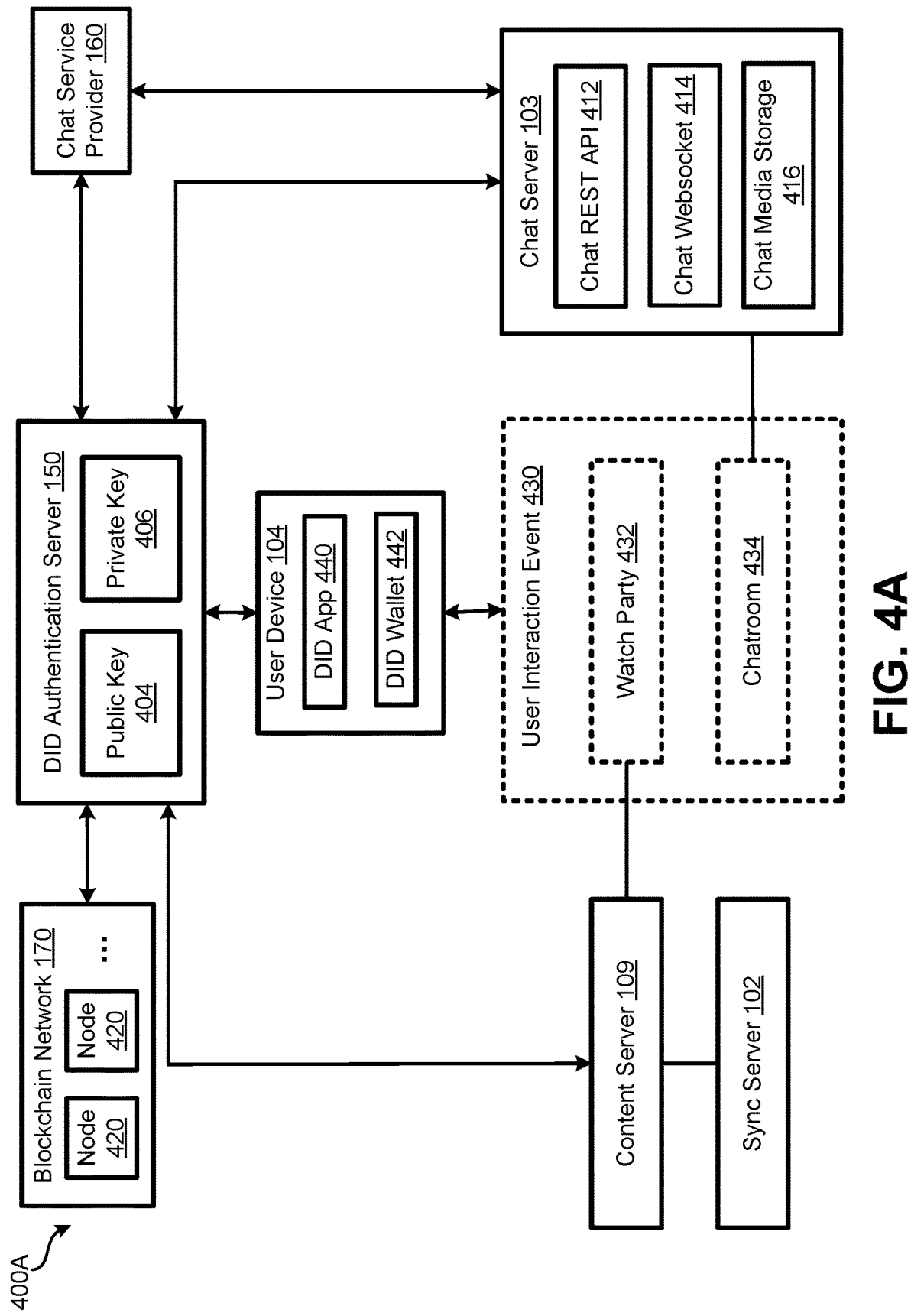
FIG. 4A is a schematic illustration of an example system for facilitating user authentication for a multimedia user interaction event, in accordance with various embodiments of the present disclosure.

FIG. 4A is a schematic illustration of an example of a system 400A for facilitating a user interaction event using decentralized user authentication, in accordance with various embodiments. The system 400A includes components of the system 100 of FIG. 1, such as the sync server 102, the content streaming server 109, the chat server 103, the DID authentication server 150, the blockchain network 170 in communication with the DID authentication server, and user devices 104.

In the illustrated example, the user device 104 has a DID application installed and executable on the user device 104. The user device 104 also has an identity wallet 442 stored in the memory of the user device 104. The identity wallet 442 is configured to store the user DID and other identity-related information (e.g., user information, user name, user profile, user account name, user account profile, a DID document, etc.). The user DID may be any identifier that may be associated with the user or the user device 104. The user DID may be unique to that user, at least within a scope in which the user DID is anticipated to be in use. As an example, the identifier may be a locally unique identifier, and perhaps more desirably a unique identifier for a service provider anticipated to operate globally. In some embodiments, the DID may be a Uniform Resource Identifier (URI) (such as a Uniform Resource Locator (URL)) or other pointer that relates the user or the user device 104 to mechanism to engage in trustable interactions with the DID authentication server 150.

The user DID is "decentralized" because it does not require a centralized or third-party management system for generation, registration, management, or use. Accordingly, the user DID remains under the control of the user. This is different from conventional centralized IDs based trust on centralized authorities and that remain under control of the corporate directory services, certificate authorities, domain name registries, or other centralized authority (referred to collectively as "centralized authorities" herein). Accordingly, the user DID may be any identifier that is under the control of the user and independent of any centralized authority.

In some embodiments, the structure of the user DID may be as simple as a user name or some other human understandable term. However, in other embodiments, the user DID may preferably be a random string of number and letters for increased security. In one embodiment, the user DID may be a string of 128 letters and numbers. Accordingly, the embodiments disclosed herein are not dependent on any specific implementation of the user DID. In a very simple example, the user DID is shown as "XYZ321".

The DID application 440, when executing on the user device 104, can transmit information to the DID authentication server 150. The DID authentication server is configured to receive information from the user device, communicate with other components such as the chat service provider 160 and the blockchain network 170, process the information, verify user credentials, authenticate users, and determine eligibility of the user device.

As described above, the DID authentication server 150 is used to authenticate users for obtaining chat services from the chat service provider 160 (e.g., logging on the chat server, initiating a chat session, managing a chat room, participating in a chat room and/or chat session, communicating with other users in the same chat room or during the same chat session, etc.). The DID authentication server 150 may receive and store a pair of user keys (i.e., the user public key 404 and a user private key 406). The pair of user keys may be used in a user authentication process. The user public key 404 may be generated by and stored on in the blockchain network 170 and used for verification of user signature to authenticate the user. The user private key may be generated by the DID application 440 of the user device and securely stored by the user. The private key may be used for signing a signature verification value. Details of the user authentication process are described below with reference to FIGS. 5A-6C.

The user DID may also have control of the pair of user keys (i.e., private key and the public key) associated with the user DID. Because the user DID is independent of any centralized authority, the user private key should be fully in control of the user. That is, the private and public keys should be generated in a decentralized manner that ensures that they remain under the control of the user DID. The user private key and the user public key may not be generated on a server controlled by any centralized authority as this may cause the user private key and user public key to not be fully under the control of the user. It will also be noted that other types of reasonable cryptographic information and/or mechanisms, not based on the user key pair, may also be used as circumstances warrant.

In some embodiments, a user DID document may also be generated at the time that the user DID is created. In its simplest form, the user DID document describes how to use the user DID. The user DID document may include a reference to the user DID, which is the user DID that is described by the user DID document. The user DID document may be stored in the memory of the user device 104. The user DID document also includes the user public key or some other equivalent cryptographic information. The user public key may be used by third party entities (e.g., the DID authentication server 150 or the chat service provider 130) that are given permission by the user to access information and data owned by the user. The user public key may also be used by verify that the user in fact owns or controls the user DID (e.g., through verification of the user's signature).

The user DID document may also include authentication information. The authentication information may specify one or more mechanisms by which the user is able to prove that the user owns the user DID. In other words, the mechanisms of authentication information may show proof of a binding between the user DID and the user DID document. In one embodiment, the authentication information may specify that the user public key be used in a signature operation to prove the ownership of the user.

The user DID document may also include authorization information. The authorization information may allow the user to authorize third party entities the rights to modify the user DID document or some part of the user DID document without giving the third party the right to prove ownership of the user DID. For example, the authorization information may allow the third party to update any designated set of one or more fields in the user DID document using any designated update mechanism.

The user DID document may further include identification information. The identification information may include personally identifiable information such as the name, address, occupation, family members, age, hobbies, interests, or the like of the user. Accordingly, the identification information listed in the user DID document may represent a persona of the user, and the persona may be pseudo-anonymous or fully anonymous. For example, authenticated users in the user interaction event (i.e., the watch party session and the chat session) keep their identity and personal information anonymous or unexposed to each other. This may provide significant privacy protection for users, particularly, host users who are celebrity of public figures, as compared to the traditional centralized authentication.

The use DID document may also include various other information. In some embodiments, the other information may include metadata specifying when the user DID document was created and/or when it was last modified. In other embodiments, the other information may include cryptographic proofs of the integrity of the user DID document. In still further embodiments, the other information may include additional information that is either specified by the specific method implementing the user DID document or desired by the user.

The chat server 103 is in communication with the DID authentication server 150 and the chat service provider 160 and includes, among other components, a chat representational state transfer (REST) API 412, a chat websocket 414, and a chat media storage 416. The chat REST API 412 is primarily functioned to handle tasks that are not directly related to communication and message transmission between the user devices and the chat server (e.g., user authentication). The chat websocket 414 is primarily functioned to manage the chat links (i.e., communication and message transmission between the user devices and the chat server). For example, the chat websocket 414 may be able to synchronize the presentation of content during the watch party session and the communication during the chat session in the same user interaction event. The chat media storage 416 can facilitate transmission of user media files between the user devices and the server through one or more media links.

The blockchain network 170 includes a plurality of blockchain nodes 420. The user DID have been registered on the blockchain network. The user DID document associated with the user DID and the information contained therein may also be stored in the distributed blockchain nodes 420 of the blockchain network 170. The blockchain network 170 may operate according to any known standards or methods for distributed ledgers. Examples of conventional distributed ledgers that may correspond to the distributed ledger or blockchain network 170 include, but are not limited to, Bitcoin, Ethereum, and Litecoin. Commercial software such as MetaMask may be to interact with the blockchain network 170 and allow users to access their DID wallet (e.g., Ethereum wallet) through a browser extension or mobile app installed on the user device 104, which can then be used to facilitate user authentication.

Once the user is authenticated, the user device 104 can be communicatively connected to the content streaming server 109, the sync server 102, and the chat server 103. The user using the user device 104 can initiate or access a user interaction event 430. For example, an authenticated host user can initiate a watch party session 432 and initiate a chat session in a chat room 434 (e.g., generated by the chat server 103). Similarly, an authenticated guest user can participate in the chat room 434.

Figure 4B:
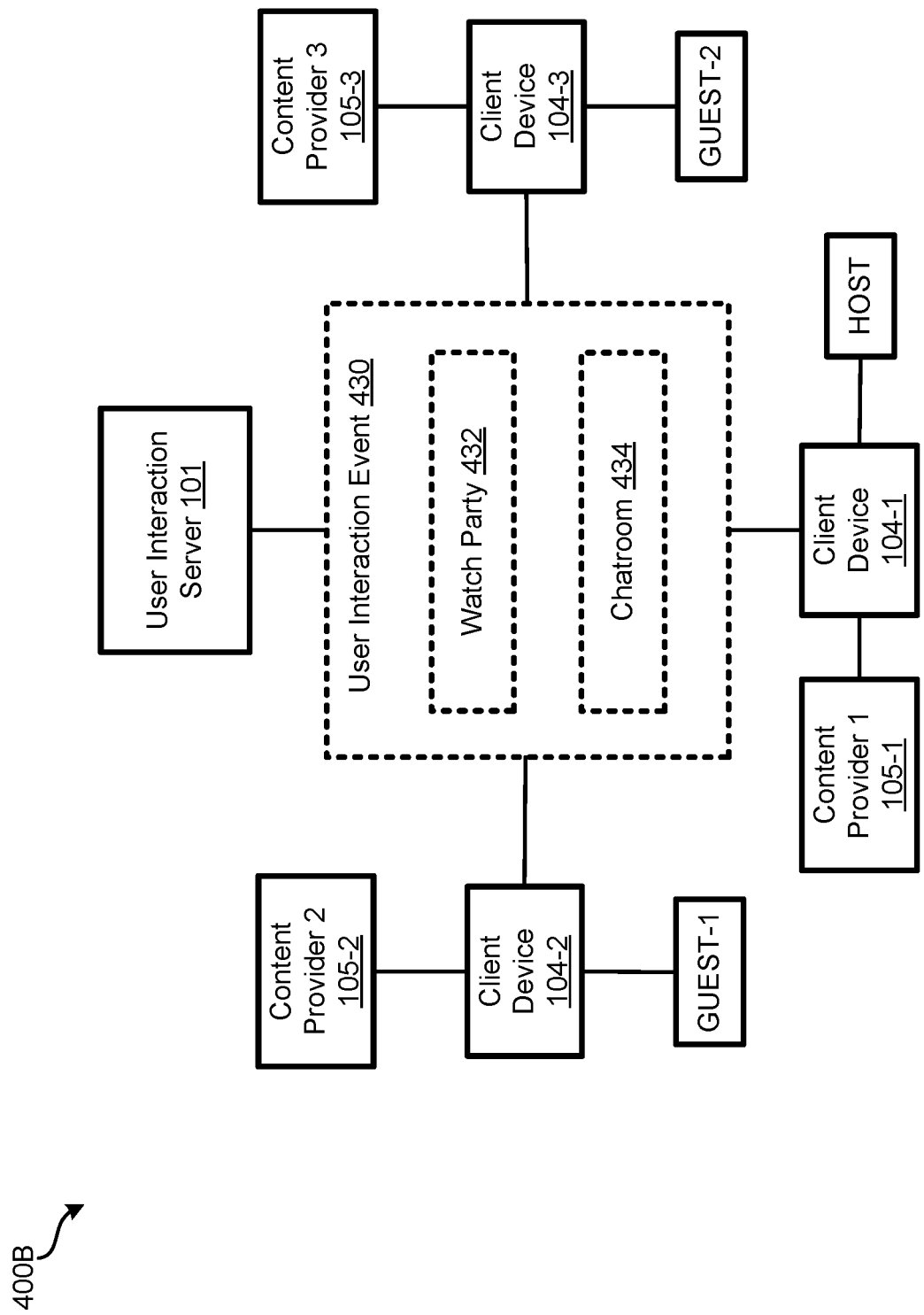
FIGS. 4B and 4C are schematic illustrations of example systems for facilitating a multimedia user interaction event, in accordance with various embodiments of the present disclosure.

FIG. 4B is a schematic illustration of an example of a system 400B for facilitating a user interaction event, in accordance with various embodiments. The system 400B is a close variation of the system 100 of FIG. 1 and may include any component thereof and/or additional component not shown in FIG. 1.

In the illustrated example, the system 400B includes multiple client devices and multiple content providers. The first client device 104-1 is associated with a host user and in connection with a first content provider 105-1. Likewise, the second client device 104-2 is associated with a first guest user (i.e., guest-1) and in connection with a second content provider 105-2, and the third client device 104-3 is associated with a second guest user (i.e., guest-2) and in connection with a third content provider 105-3. The host user may be a subscriber to the first content provider 105-1, the first guest user may be a subscriber to the second content provider 105-2, and the second guest user may be a subscriber to the third content provider 105-3. The host user, the first and second guest users may access the user interaction event 430 through the user interaction server 101, as described above.

The host user may select a particular content provided by the first content provider 105-1, and the selected content is presented in the user interaction event. The first and second guest users may not be subscribers to the first content provider 105-1, but they may access the selected content provided by the second content provider 105-2 and the third content provider 105-3, respectively. The user interaction server 101 may be operable to receive the selected content from different content providers (e.g., 105-1, 105-2, and 105-3) and synchronize the presentation of the selected content on the respective user devices (e.g., 104-1, 104-2, and 104-3).

Figure 4C:
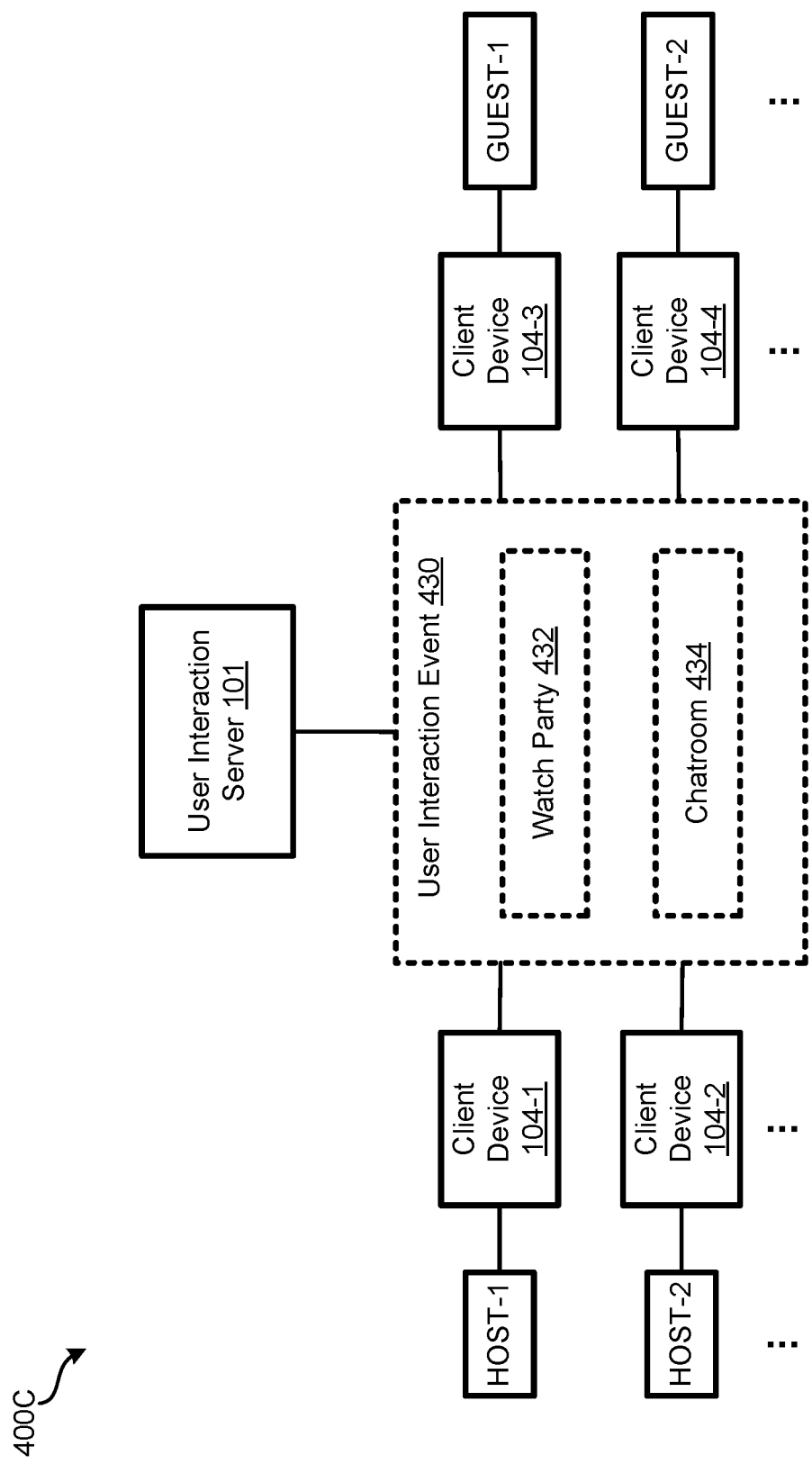

FIG. 4C is a schematic illustration of an example of a system 400C for facilitating a user interaction event, in accordance with various embodiments. The system 400C is a close variation of the system 100 of FIG. 1. In the illustrated example, the system 400C includes multiple client devices associated with multiple host users and multiple guest users. The user interaction event 430 may be initiated by one of the multiple host users and co-hosted by the multiple host users. The multiple host users and the multiple guest users may access the user interaction event 430 through the user interaction server 101, as described above. The user interaction server 101 may be operable to determine the priority of the multiple host users according to a pre-established policy/standard to resolve any conflict in the management of the user interaction event.

FIG. 5A illustrates a system messaging diagram 500 of the interactions between components of the system 100. Each component includes software, hardware, or a combination of both. In one example, a first user device 104-1, used by a host user, can select a content and transmit (TRANSMISSION 502) a request for the selected content to the content streaming server 109. Upon receipt of the request for content and authentication of the host user, the content streaming server 109 is operated to initiate (FUNCTION 504) streaming of the selected content. The selected content is transmitted to the user device 104-1 (TRANSMISSION 506). The host user is capable of viewing content (FUNCTION 508) and controlling the playing of the content on the first user device 104-1. A content link may be established to link the first user device 104-1 and the content streaming server 109. A request for a virtual chat room by the host user may be transmitted (TRANSMISSION 510) to the chat server 103. Upon receipt of the request for chat room and authentication of the host user, the chat server 103 is operated to generate a chat room (FUNCTION 512). A response to the request is transmitted to the first user device 104-1 (TRANSMISSION 514) to allow the host user to access and manage the chat room using the chat room application installed on the first user device 104-1. The host user may initiate a chat session (FUNCTION 516) in the chat room and host the chat session (FUNCTION 524), using the first user device 104-1.

A user request for participating in the chat room by a guest user may be transmitted (TRANSMISSION 518) from a second user device 104-2 to the chat server 103. Upon authentication of the guest user, the chat server 103 authorizes the guest user by responding to the request (TRANSMISSION 520), and the guest user can participate in the chat room (FUNCTION 522) and the chat session initiated by the host user, and communicate with the first user device 104-1 (COMMUNICATION 523) in the chat session. One or more chat links/media links may be established between the first user device 104-1 and the chat server 103, as well as between the second user device 104-2 and the chat server 103 to facilitate the communication between the first user device 104-1 and the second user device 104-2.

A request for synchronization by the host user may be transmitted (TRANSMISSION 526) from the first user device 104-1 to the sync server 102. Upon receipt of the request for synchronization, the sync server may initialize synchronization (FUNCTION 528), and transmit the content selected by the host user to the second user device 104-2 (TRANSMISSION 530). The synchronized content may be presented on the second user device 104-2 to allow the guest user to view (FUNCTION 532).

Figure 5B:
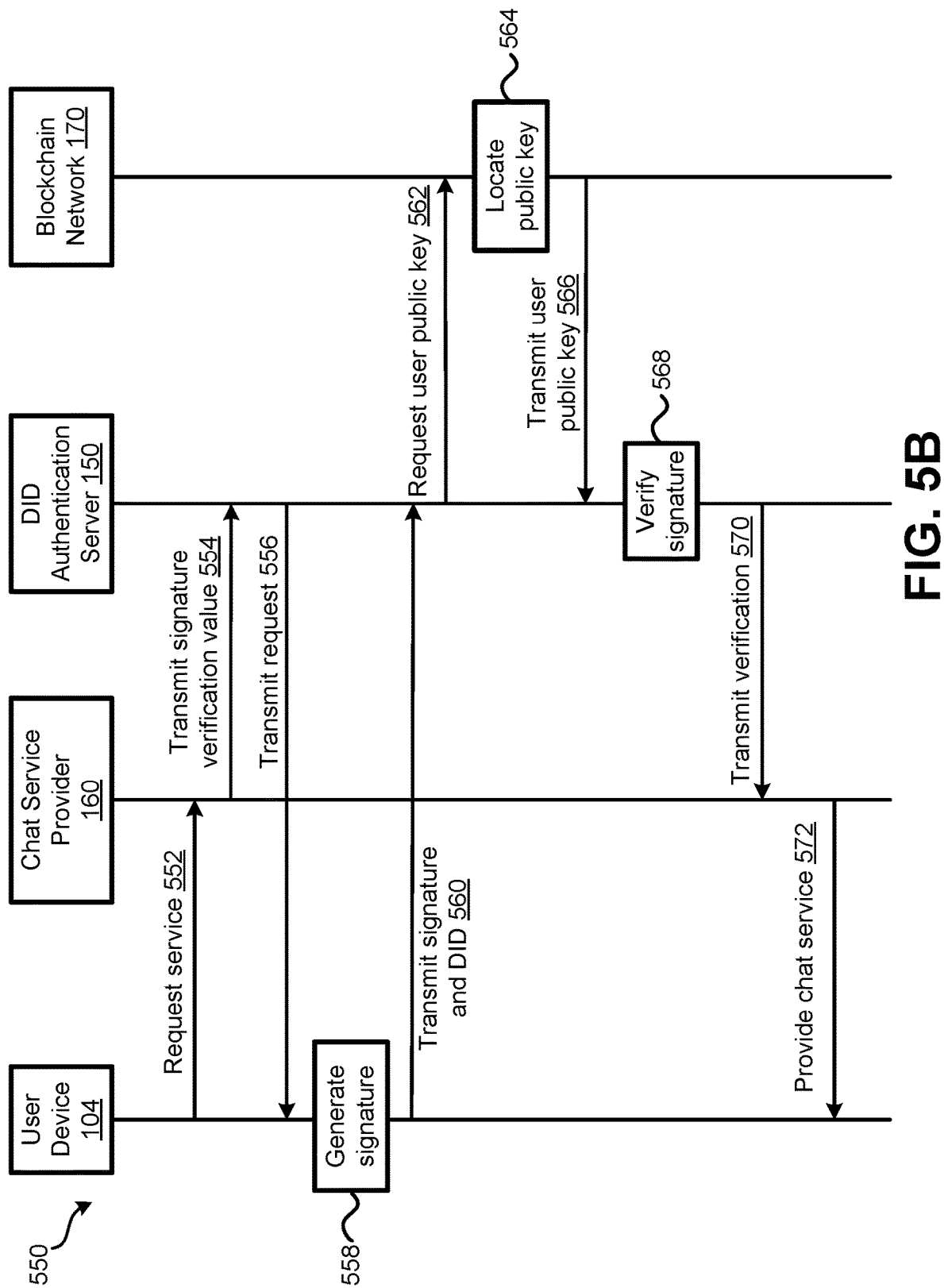

FIG. 5B illustrates a system messaging diagram 550 of the interactions between components of the system 400A. Each component includes software, hardware, or a combination of both. In one example, a request for chat service by a user (e.g., a host user or a guest user) is transmitted (TRANSMISSION 552) from a user device 104 to a chat service provider 160. Upon receipt of the request, the chat service provider 160 may generate a signature verification value for the user and transmit the signature verification value (TRANSMISSION 554) to the DID authentication server 150. Upon receipt of the signature verification value, the DID authentication server transmit a request for user signature (TRANSMISSION 556) to the user device 104. The user request may also contain the user signature value. Upon receipt of the request for user signature, the user device 104 may generate a user signature (FUNCTION 558) by signing the signature verification value with a user private key securely stored in the user device. The user signature and associated user DID are transmitted (TRANSMISSION 560) to the DID authentication server 150. Upon receipt of the signature and the user DID, the DID authentication server 150 transmit a request for user public key associated with the user (TRANSMISSION 562) to the blockchain network 170. Upon receipt of the request, the blockchain network 170 locates the user public key (FUNCTION 564) stored thereon, based on the user DID previously registered and stored on the blockchain network 170. The user public key is transmitted to the DID authentication server 150 (TRANSMISSION 566). Upon receipt of the user public key, the DID authentication server performs a verification of user signature (FUNCTION 568) using the user public key and the user private key associated with the user DID. Upon verification, a notification is transmitted to the chat service provider 160 (TRANSMISSION 570) to indicate that the user is authenticated. Upon notification, the chat service provider 160 provides chat service (TRANSMISSION 572) to the user of the user device 104 (e.g., causing the chat server to generate a chat room for the host user, or permit a guest user to participate in an existing chat room or chat session, etc.).

Figure 6A:
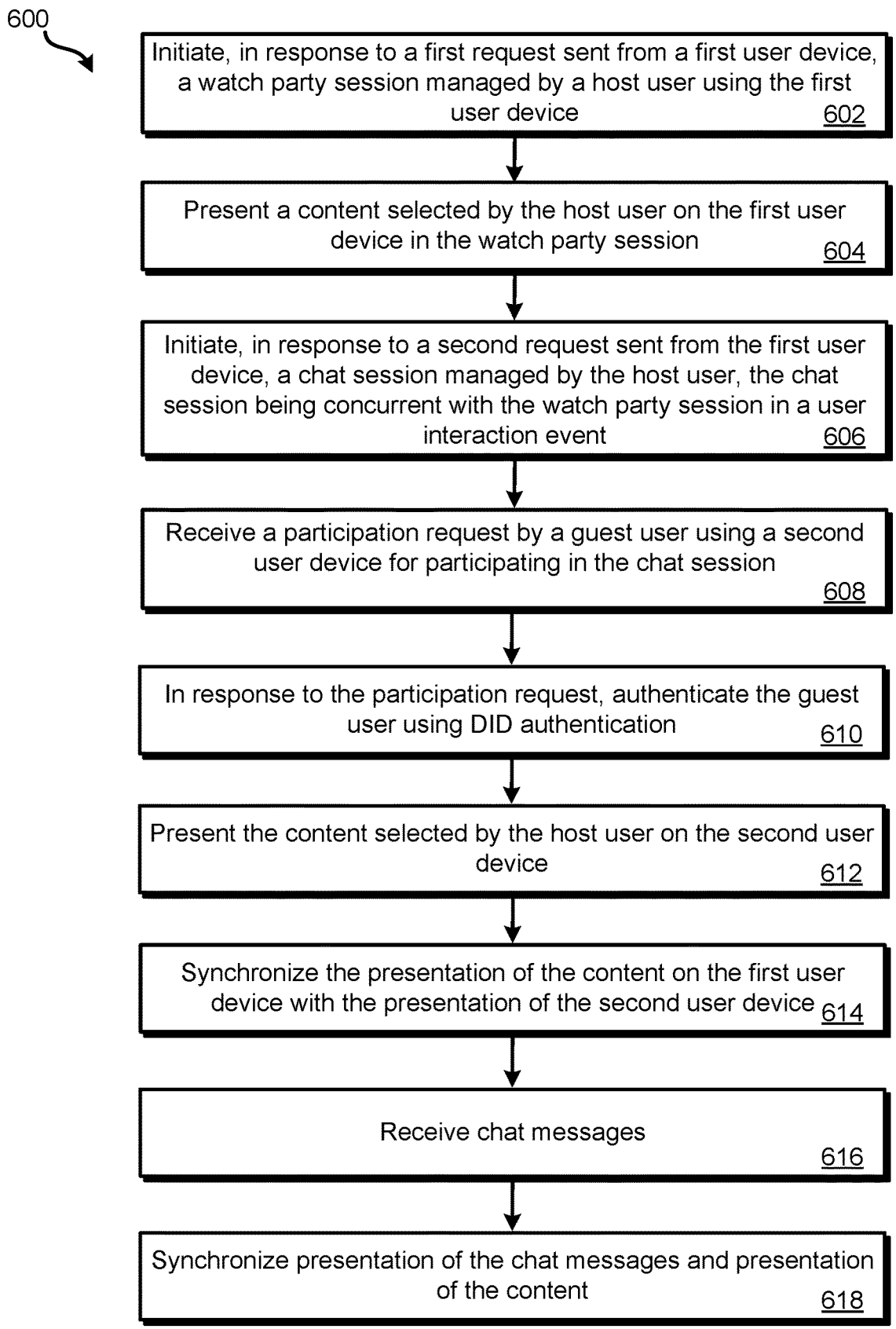
FIGS. 6A-6F are flow diagrams illustrating example methods, in accordance with various embodiments.

FIG. 6A is a flow diagram illustrating an example method 600, according to various embodiments. The method 600 may be performed by a device, apparatus, or system. The method 600 may be performed by one or more components of the system or device illustrated by FIGS. 1-2 and 4A-4C, such as one or more components of the systems 100 and 400A. Depending on the implementation, the method 600 may include additional, fewer, or alternative steps performed in various orders or in parallel.

At 602, a watch party session is initiated, in response to a first request by a first user and sent from a watch party application installed on first user device. The first user may be a host user who can manage the watch party session using the first user device. At 604, a content selected by the host user is presented on the first user device in the watch party session. The watch party session may be supported by a visual interface of a user interface on the first user device. At 606, a chat session is initiated in response to a second request sent from the first user device. The host user may be authenticated before the chat session is initiated. The chat session is concurrent with the watch party session and managed by the host user using the first user device. The chat session may be supported by a chat interface of the user interface on the first user device. The chat session may include one or more chat threads, and each chat thread may further include one or more host chat messages (i.e., chat messages sent from a host user device) and guest chat messages (i.e., chat messages sent from a guest user device).

At 608, a request by a second user (i.e., a guest user) for participating the chat session initiated by the first user is sent from a second user device used by the second user and received by a chat service provider. The second user is a guest user who desires to participate in the watch party session and the chat session concurrent with the watch party session. At 610, an authentication process is performed to authenticate the second user, in response to the participation request. The authentication process may be a DID authentication process described herein. Upon authentication, the guest user is able to participate in the watch party session and the chat session. At 612, the content selected by the host user is presented on the second user device to allow the guest user to view. At 614, the presentations of the selected content on the first user device and the second user device are synchronized, such that the host user and the guest user can view the same content in a substantially simultaneous manner. At 616, communication between the guest user and the host user is facilitated during the chat session. The communication may include comments regarding the content presented during the watch party session. In some embodiments, chat messages are received from the first and second user devices on the chat server. At 618, presentations of the chat messages are synchronized on the first and the second user devices.

Figure 6B:
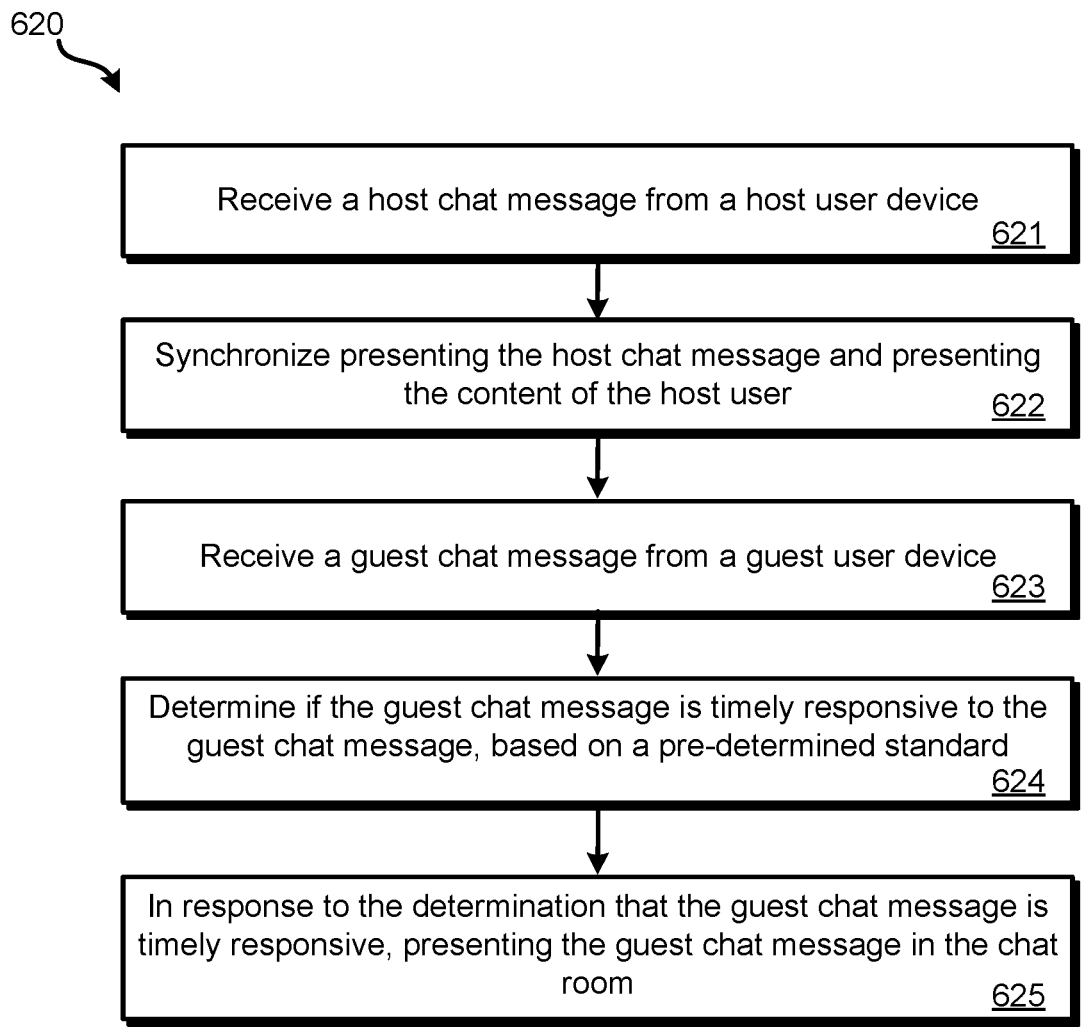

FIG. 6B is a flow diagram illustrating an example method 620 for managing the user interaction event, according to various embodiments. The method 620 may be performed by a device, apparatus, or system. The method 620 may be performed by one or more components of the system or device illustrated by FIGS. 1-2 and 4A-4C, such as one or more components of the systems 400A-400C. Depending on the implementation, the method 620 may include additional, fewer, or alternative steps performed in various orders or in parallel.

At 621, a host chat message from a host user device is received during a chat session in a user interaction event. The host chat message may include the host user's comment on the content presented in the watch party session or other information pertaining to the media content of the watch party session of the user interaction event. A chat thread may be initiated by presenting the host chat message in the chat room.

At 622, presenting the host chat message and presenting the content of the host user are synchronized on the guest user devices that participate in the user interaction event. In this way, the guest users can view both the content of the media and the content of the host chat message that are synchronized on the user interface of the guest user device.

At 623, a guest chat message from a guest user device is received. The guest chat message may be made by the guest user in response to the host chat message or the content thereof.

At 624, a determination on whether the guest chat message is timely responsive is automatically made, based on a pre-determined standard. In one example, the pre-determined standard may include a time period (e.g., 1 minute) within the presentation of the host chat message. If the guest chat message is received after the time period lapses, the guest chat message is determined not timely responsive. The pre-determined standard may further include a policy to determine the value of the guest chat message to the user experience event, the relevance of the guest chat message to the host chat message, and/or whether the guest chat message violates an existing rule pertaining to the chat room management. If the guest chat message is determined to have insufficient value and/or insufficient relevance to the host chat message based on the pre-determined standard, the guest chat message is not timely responsive.

At 625, in response to the determination that the guest chat message is timely responsive, presenting the guest chat message in the chat room to allow other guest users to view the guest chat message on their guest user devices. If the guest chat message is determined not timely responsive, the guest chat message is withheld from presentation. This mechanism may be helpful for improving the efficiency of the user interaction at a watch party, particularly if a large number of guest users (e.g., a thousand or more) participate in the chat session.

Figure 6C:
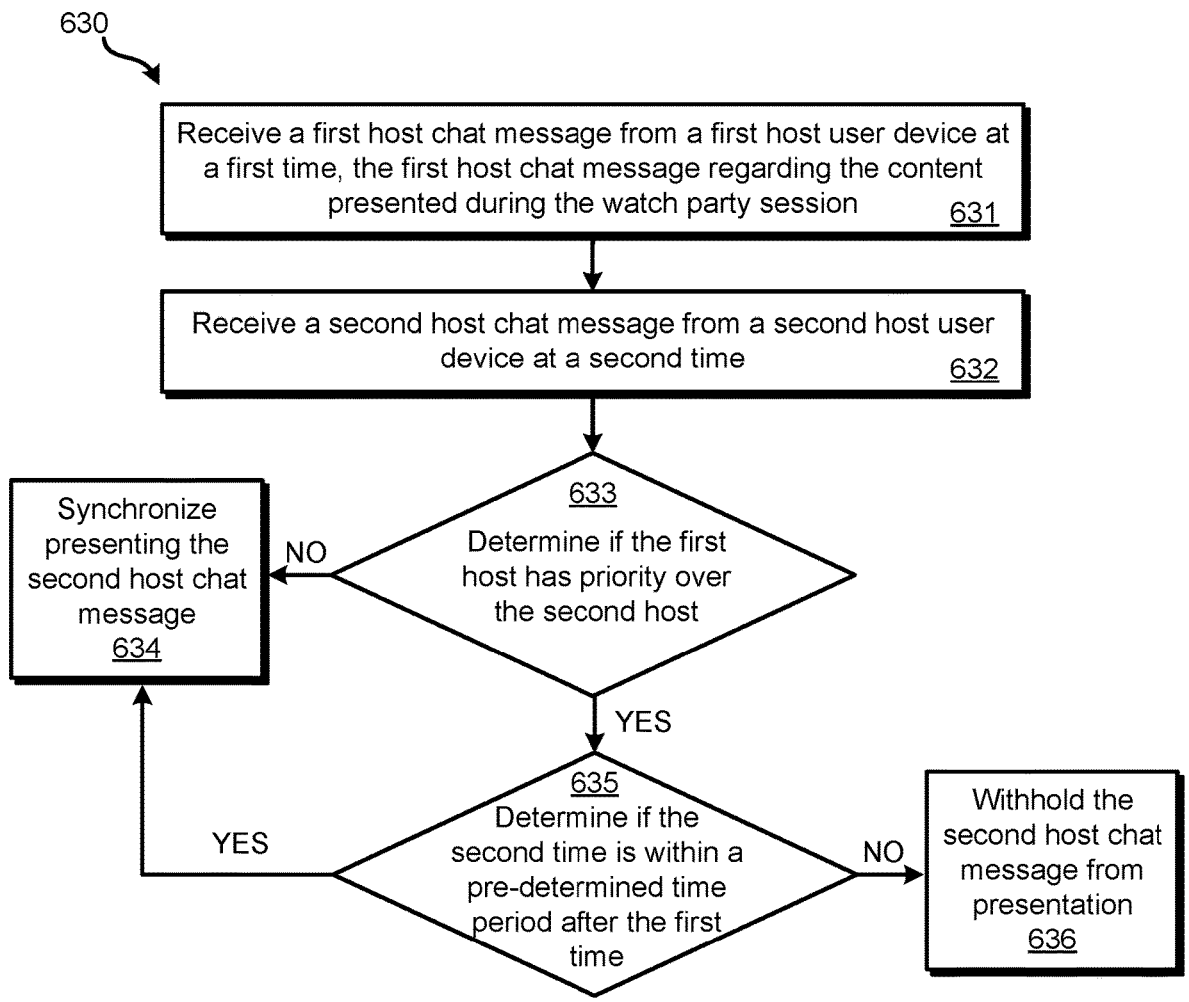

FIG. 6C is a flow diagram illustrating an example method 630 for managing the user interaction event, according to various embodiments. The method 630 may be performed by a device, apparatus, or system. The method 630 may be performed by one or more components of the system or device illustrated by FIGS. 1-2 and 4A-4C, such as one or more components of the systems 400A-400C. Depending on the implementation, the method 630 may include additional, fewer, or alternative steps performed in various orders or in parallel.

At 631, a first host chat message from a first host user device is received at a first time, the first host chat message regarding the content presented during the watch party session of a user interaction event. At 632, a second host chat message from a second host user device is received at a second time. The user interaction event may be co-hosted by the first and the second host users. In other embodiments, more than two host users may co-host the user interaction event.

At 633, a determination is made on whether the first host user has priority over the second host user, based on a pre-determined standard. For example, the pre-determined standard may indicate that the host user who initiates the watch party session or the chat session has priority over other host users.

At 634, in response to a determination that the first host user does not have priority over the second host user, the second host chat message is presented in the chat room. Presenting the second host chat message and presenting the content of the watch party session of the user interaction event may be synchronized.

At 635, in response to a determination that the first host user has priority over the second host user, a determination is made on whether the second host chat message is timely responsive (i.e., the second time is within a pre-determined time period after the first time). In response to the determination that the second host chat message is timely responsive, the method 630 proceeds to 634, and the second host chat message is presented, and the presentation is synchronized.

At 646, in response to the determination that the second host chat message is not timely responsive (i.e., the second time is not within a pre-determined time period after the first time), the second host chat message is withheld from presentation.

Figure 6D:
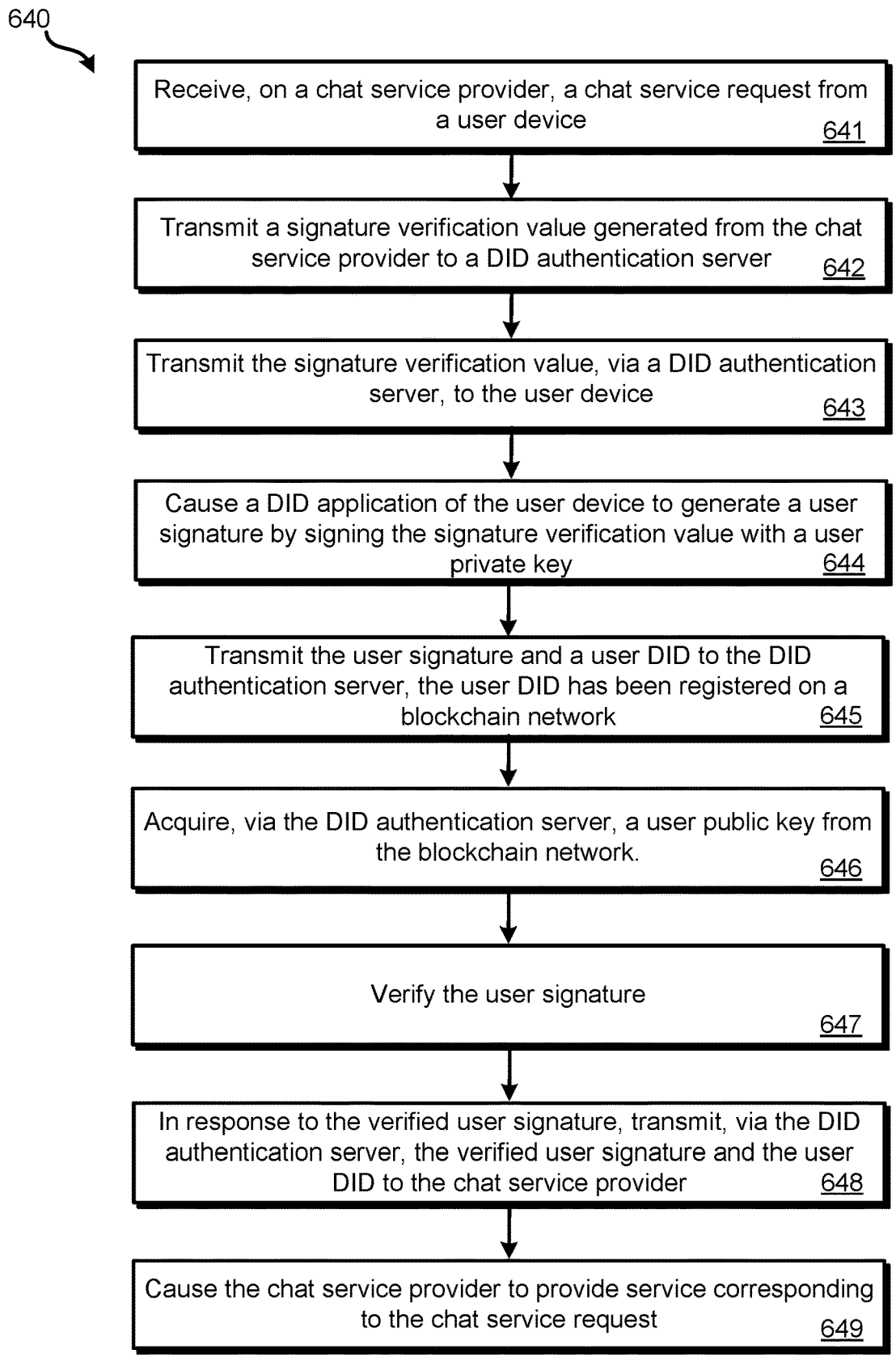

FIG. 6D is a flow diagram illustrating an example method 640 for DID authentication, according to various embodiments. The method 640 may be performed by a device, apparatus, or system. The method 640 may be performed by one or more components of the system or device illustrated by FIGS. 1-2 and 4A-4C, such as one or more components of the systems 400A-400C. Depending on the implementation, the method 640 may include additional, fewer, or alternative steps performed in various orders or in parallel.

At 641, a chat service request is sent from a user device and received on a chat service provider. The chat service request may indicate a request for a chat room, initiating a new chat session, or participating in an existing chat room or chat session.

At 642, a signature verification value is generated on the chat service provider and transmitted to the user device. The signature verification value may be an arbitrary value that is generated in a random manner to ensure that the signature verification value generated for each user authentication is different from each other. Also, the signature verification value may include a nonce, a timestamp, etc., but is not limited thereto and may include all randomly generated values.

At 643, the signature verification value is transmitted to the user device. In some embodiments, a QR code corresponding to the signature verification value may be generated by the DID authentication server, and the QR code is transmitted to the user device along with the signature verification value. The chat service application of the user device may display the QR code on a webpage or the chat application for the user to know. The DID application of the user device may acquire the signature verification value by interpreting the QR code corresponding to the signature verification value.

At 644, a DID application of the user device is operated to generate a user signature by signing the signature verification value with a user private key. If the QR code contains additional user information in addition to the signature verification value, the DID application of the user device may transmit the additional user information or encrypted user information along with the user signature and the user DID.

At 645, the user signature and a user DID are transmitted to the DID authentication server. The user DID of the user has registered on a blockchain network. At 646, a user public key associated with the user DID is acquired and received by the DID authentication server. The user public key may be stored on and located by the blockchain network.

At 647, the user signature is verified using the user public key and the user private key. In some embodiments, the DID authentication server may verify the user signature by determining whether the signature verification value obtained from decoding the user signature with the user public key matches with the signature verification value transmitted along with the user signature from the DID application of the user device. A match of the signature verification values indicates that the signature is verified. Herein, as requested by the chat service provider, the DID authentication server may additionally transmit the user information or the encrypted user information to the chat service provider.

At 648, the verified user signature and the user DID are transmitted from the DID authentication server to the chat service provider, in response to the verified user signature. The user is authenticated. At 649, the chat service provider is operated to provide chat service according to the chat service request. Also, the chat service provider may perform processes necessary for providing the chat service by referring to the user information or encrypted user information acquired from the DID authentication server.

On the other hand, while it is possible for the DID authentication server to verify the user signature by using the user signature and the user DID as explained above, it is also possible for the chat service provider to verify the user signature by using the user signature and the user DID transmitted from the DID authentication server. Accordingly, if the DID authentication server transmits the user signature and the user DID to the chat service provider, the chat service provider may acquire the user public key from the blockchain network directly by using the user DID, and thus verify the user signature by using the user public key and provide the chat service corresponding to the chat service request. Herein, the chat service provider server may verify the user signature by using the signature verification value generated in response to the chat service request information transmitted from the user device.

It is noted that the method 640 described herein may not be limited to authenticate users for accessing the chat service. Variations of the method 640 may also be used to authenticate the users for accessing the content service provided by the content provider.

Figure 6E:
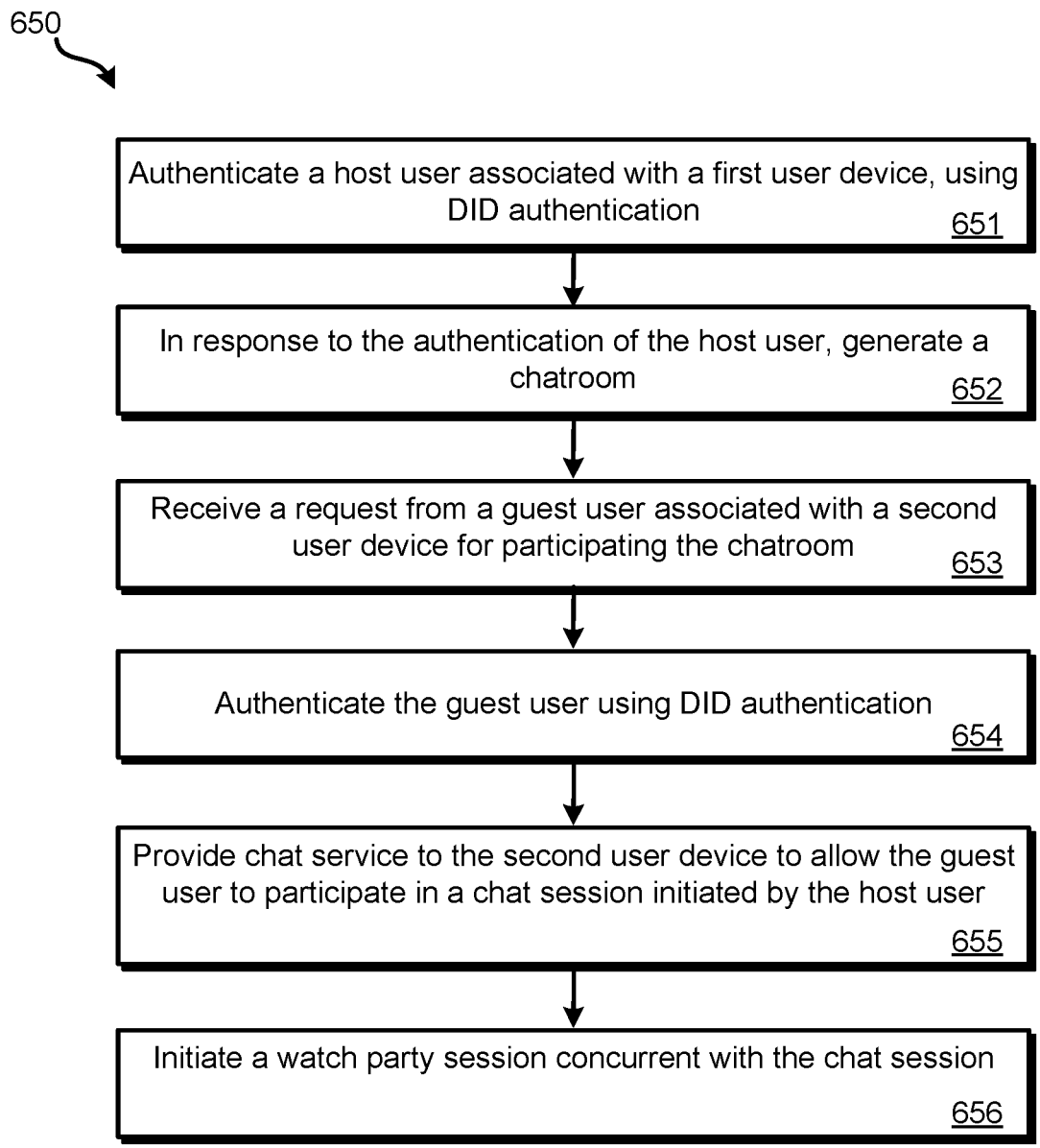

FIG. 6E is a flow diagram illustrating an example method 650, according to various embodiments. The method 650 may be performed by a device, apparatus, or system. Depending on the implementation, the method 650 may include additional, fewer, or alternative steps performed in various orders or in parallel.

At 651, a host user using a first user device is authenticated by using DID authentication, in response to a request by the host user for initiating a chat session. The DID authentication may be performed using the method 640 described herein. At 652, a chat room is generated for the authenticated host user to manage, in response to the authentication of the host user. The host user may initiate a chat session in the chat room. At 653, a request by a guest user for participating the chat room managed by the host user is received from a second user device used by the guest user.

At 654, the guest user is authenticated using DID authentication. At 655, chat service is provided to the second user device to allow the guest user to participate in the chat room and chat session initiated by the host user. Communication between the host user and the guest user is facilitated by one or more chat links established between the first user device and second user device via a chat server. At 656, a watch party session is initiated, and the chat session is concurrently with the watch party session. Content selected by the host user may be presented, and the presentation of the contents on the first and second user devices may be synchronized.

Figure 6F:
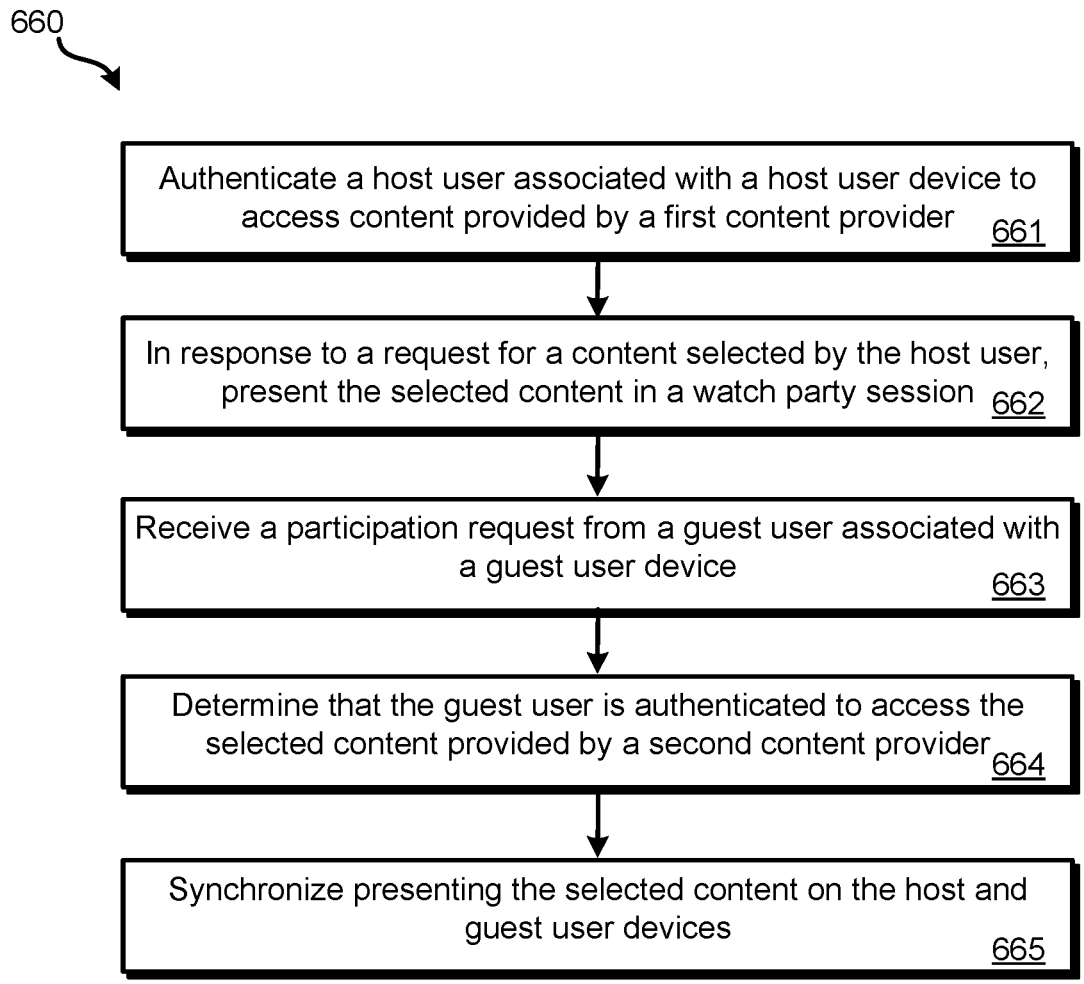

FIG. 6F is a flow diagram illustrating an example method 660, according to various embodiments. The method 660 may be performed by a device, apparatus, or system. Depending on the implementation, the method 660 may include additional, fewer, or alternative steps performed in various orders or in parallel.

At 661, a host user associated with a host user device is authenticated to access a first content source provided by a first content provider. At 662, a content included in the first content source is selected by the host user, and a request by the host user for presenting the selected content is received. In response to the request, the selected content is presented in a watch party session to be shared with guest users that participate in the watch party session.

At 663, a participation request by a guest user associated with a guest user device is received. At 664, a determination is made on whether the guest user is authenticated and authorized to access the first content source provided by the first content provider. If the guest user is not authorized, a determination is made on whether the guest user is authenticated or authorized to access a second content source provided by a second content provider, the second content source including the selected content by the host user. In response to a determination that the guest user is authenticated or authorized to access the selected content included a second content source provided by a second content provider, the selected content from the second content source is presented on the guest user. At 665, presenting the selected content on the host and guest user devices are synchronized.

Figure 7:
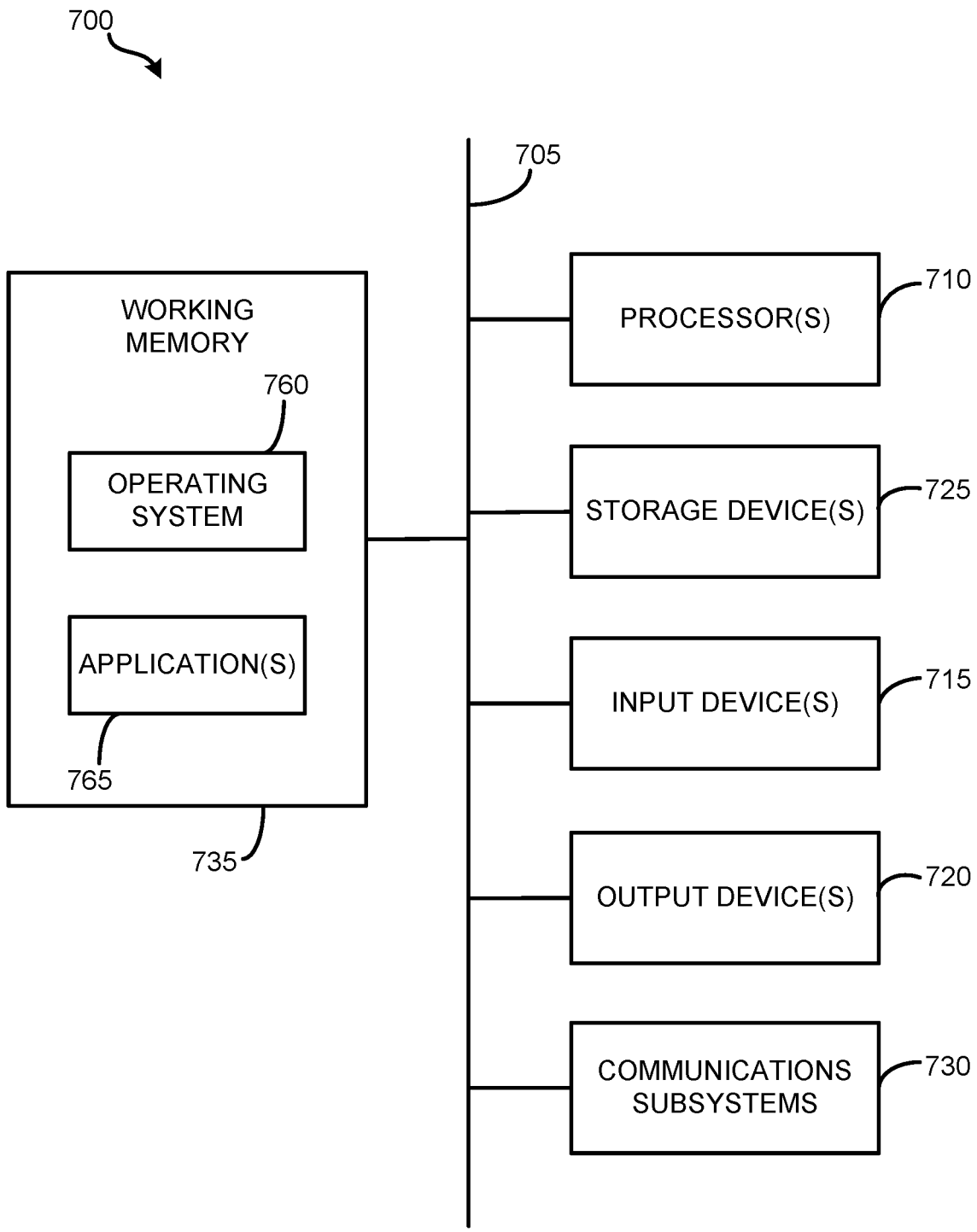
FIG. 7 is a schematic diagram illustrating an embodiment of a computer system according to various embodiments.

FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method, comprising:
   initiating, in response to a first request by a first host user sent from a first host user device, a watch party session managed by the first host user using the first host user device;
   presenting video content selected by the first host user on the first host user device during the watch party session;
   initiating, in response to a second request sent from the first host user device, a chat session managed by the first host user using the first host user device, the chat session being concurrent with the watch party session in a user interaction event;
   receiving a participation request by a guest user sent from a guest user device for participating in the chat session;
   in response to the participation request, authenticating the guest user;
   presenting the video content selected by the first host user on the guest user device to allow the guest user to view the content on the guest user device;
   synchronizing the presentation of the video content on the first host user device with the presentation of the video content on the guest user device;
   receiving a first host chat message sent from the first host user device when the video content is being presented in the watch party session;
   presenting the first host chat message in the chat session;
   synchronizing the presentation of the first host chat message in the chat session and the presentation of the selected content in the watch party session;
   receiving a guest chat message sent from the guest user device after receiving the first host chat message when the video content is being presented in the watch party session; and
   in response to a determination that the guest chat message is not timely responsive to the first host chat message and not relevant to the video content being presented in the watch party session based on a pre-determined standard, withholding presentation of the guest chat message in the chat session.

2. The method of claim 1, wherein the guest user is authenticated using a decentralized identifier (DID) authentication process.

3. The method of claim 2, wherein the DID authentication process comprises:
   transmitting a user DID of the guest user to a DID authentication server, the user DID having been registered on a blockchain network;
   generating a user signature of the guest user and transmitting the user signature to the DID authentication server;
   receiving, on the DID authentication server, a user public key from the blockchain network using the user DID; and
   verifying, on the DID authentication server, the user signature using the public key.

4. The method of claim 3, wherein generating the user signature further comprises:
   generating a signature verification value for the user DID; and
   signing the signature verification value with a user private key associated with the user DID.

5. The method of claim 1, further comprising:
authenticating the first host user prior to initiating the chat session.

6. The method of claim 1, wherein the watch party session is supported by a visual interface of a user interface.

7. The method of claim 6, wherein the chat session is supported by a chat interface of the user interface.

8. The method of claim 1, wherein the first host chat message includes comments regarding the content presented during the watch party session.

9. The method of claim 1, further comprising:
receiving a second host chat message sent from a second host user device after receiving the first host chat message, when the video content is being presented in the watch party session;
in response to a determination that the first host user does not have priority over the second host user based on a pre-determined priority rule, presenting the second host chat message in the chat session; and
synchronizing presentation of the second host chat message with the presentation of the video content in the watch party session.

10. The method of claim 1, further comprising:
receiving a second host chat message sent from a second host user device after receiving the first host chat message, when the video content is being presented in the watch party session;
in response to a determination that the first host user has priority over the second host user based on a pre-determined priority rule, determining whether the second host chat message is timely responsive to the first host chat message; and
in response to the determination that the second host chat message is not timely responsive, withholding presentation of the second host chat message in the chat session.

11. A system, comprising:
one or more processors; and
a computer-readable storage media storing computer-executable instructions that, when executed by the one or more processors, cause the system to perform:
initiating, in response to a first request by a first host user sent from a first host user device, a watch party session managed by the first host user using the first host user device;
presenting video content selected by the first host user on the first host user device during the watch party session;
initiating, in response to a second request sent from the first host user device, a chat session managed by the first host user using the first host user device, the chat session being concurrent with the watch party session in a user interaction event;
receiving a participation request by a guest user sent from a guest user device for participating in the chat session;
in response to the participation request, authenticating the guest user;
presenting the video content selected by the first host user on the guest user device to allow the guest user to view the content on the guest user device;
synchronizing the presentation of the video content on the first host user device with the presentation of the video content on the guest user device;
receiving a first host chat message sent from the first host user device when the video content is being presented in the watch party session;
presenting the first host chat message in the chat session;
synchronizing the presentation of the first host chat message in the chat session and the presentation of the selected content in the watch party session;
receiving a guest chat message sent from the guest user device after receiving the first host chat message when the video content is being presented in the watch party session; and
in response to a determination that the guest chat message is not timely responsive to the first host chat message and not relevant to the video content being presented in the watch party session based on a pre-determined standard, withholding presentation of the guest chat message in the chat session.

12. The system of claim 11, wherein the guest user is authenticated using a DID authentication process.

13. The system of claim 12, wherein, when executed by one or more processors, the computer-executable instructions further cause the system to perform:
transmitting a user DID of the guest user to a DID authentication server, the user DID having been registered on a blockchain network;
generating a user signature of the guest user and transmitting the user signature to the DID authentication server;
receiving, on the DID authentication server, a user public key from the blockchain network using the user DID; and
verifying, on the DID authentication server, the user signature using the public key.

14. The system of claim 13, wherein, when executed by one or more processors, the computer-executable instructions further cause the system to perform:
generating a signature verification value for the user DID; and
signing the signature verification value with a user private key associated with the user DID to generate the user signature.

15. The system of claim 11, wherein, when executed by one or more processors, the computer-executable instructions further cause the system to perform:
authenticating the first host user prior to initiating the chat session.

16. The system of claim 11, wherein the watch party session is supported by a visual interface of a user interface.

17. The system of claim 16, wherein the chat session is supported by a chat interface of the user interface.

18. The system of claim 11, wherein the first host chat message includes comments regarding the content presented during the watch party session.

19. The system of claim 11, wherein, when executed by one or more processors, the computer-executable instructions further cause the system to perform:
receiving a second host chat message sent from a second host user device after receiving the first host chat message, when the video content is being presented in the watch party session;
in response to a determination that the first host user does not have priority over the second host user based on a pre-determined priority rule, presenting the second host chat message in the chat session; and
synchronizing presentation of the second host chat message with the presentation of the video content in the watch party session.

20. The system of claim 11, wherein, when executed by one or more processors, the computer-executable instructions further cause the system to perform:

receiving a second host chat message sent from a second host user device after receiving the first host chat message, when the video content is being presented in the watch party session;

in response to a determination that the first host user has priority over the second host user based on a predetermined priority rule, determining whether the second host chat message is timely responsive to the first host chat message; and in response to the determination that the second host chat message is not timely responsive, withholding presentation of the second host chat message in the chat session.

\* \* \* \* \*